United States Patent
Holt

(10) Patent No.: US 7,818,296 B2
(45) Date of Patent: Oct. 19, 2010

(54) COMPUTER ARCHITECTURE AND METHOD OF OPERATION FOR MULTI-COMPUTER DISTRIBUTED PROCESSING WITH SYNCHRONIZATION

(75) Inventor: John Matthew Holt, Lindfield (AU)

(73) Assignee: Waratek Pty Ltd., Lindfield, New South Wales (AU)

( * ) Notice: Subject to any disclaimer, the term of this patent is extended or adjusted under 35 U.S.C. 154(b) by 112 days.

(21) Appl. No.: 12/343,419

(22) Filed: Dec. 23, 2008

(65) Prior Publication Data

US 2009/0235034 A1   Sep. 17, 2009

Related U.S. Application Data

(63) Continuation of application No. 11/259,761, filed on Oct. 25, 2005, now abandoned, which is a continuation-in-part of application No. 11/111,779, filed on Apr. 22, 2005, which is a continuation-in-part of application No. 10/830,042, filed on Apr. 23, 2004.

(51) Int. Cl.
    *G06F 17/30* (2006.01)
(52) U.S. Cl. .................... 707/620; 711/141; 709/248
(58) Field of Classification Search ............ 707/616, 707/610, 620, 8, 1, 206; 709/248; 711/141
See application file for complete search history.

(56) References Cited

U.S. PATENT DOCUMENTS

| | | | |
|---|---|---|---|
| 4,969,092 A | 11/1990 | Shorter | |
| 5,214,776 A | 5/1993 | Bagnoli et al. | |
| 5,291,597 A | 3/1994 | Shorter | |
| 5,418,966 A * | 5/1995 | Madduri | 710/200 |
| 5,434,994 A | 7/1995 | Shaheen et al. | |
| 5,488,723 A | 1/1996 | Baradel et al. | |
| 5,544,345 A | 8/1996 | Carpenter et al. | |
| 5,568,609 A | 10/1996 | Sugiyama et al. | |
| 5,612,865 A | 3/1997 | Dasgupta | |
| 5,802,585 A | 9/1998 | Scales et al. | |

(Continued)

FOREIGN PATENT DOCUMENTS

EP        0969377        1/2000

(Continued)

OTHER PUBLICATIONS

Bal et al., Orca: Alanguage for Parallel Programming of Distributed Systems, Dec. 6, 1999, pp. 190-205.*

(Continued)

*Primary Examiner*—John R. Cottingham
*Assistant Examiner*—Sherief Badawi
(74) *Attorney, Agent, or Firm*—Pillsbury Winthrop Shaw Pittman LLP

(57) ABSTRACT

The present invention discloses a modified computer architecture (50, 71, 72) which enables an applications program (50) to be run simultaneously on a plurality of computers (M1, . . . Mn). Shared memory at each computer is updated with amendments and/or overwrites so that all memory read requests are satisfied locally. During initial program loading (75), or similar, instructions which result in the application program (50) acquiring (or releasing) a lock on a particular asset (50A, 50X-50Y) (synchronization) are identified. Additional instructions are inserted (162, 163) to result in a modified synchronization routine with which all computers are updated.

13 Claims, 15 Drawing Sheets

U.S. PATENT DOCUMENTS

| | | | |
|---|---|---|---|
| 5,918,248 | A | 6/1999 | Newell et al. |
| 6,049,809 | A | 4/2000 | Raman et al. |
| 6,148,377 | A | 11/2000 | Carter et al. |
| 6,163,801 | A | 12/2000 | O'Donnell et al. |
| 6,192,514 | B1 | 2/2001 | Lurndal |
| 6,314,558 | B1 | 11/2001 | Angel et al. |
| 6,324,587 | B1 | 11/2001 | Trenbeath et al. |
| 6,327,630 | B1 | 12/2001 | Carroll et al. |
| 6,370,625 | B1 | 4/2002 | Carmean et al. |
| 6,389,423 | B1 | 5/2002 | Sakakura |
| 6,425,016 | B1 | 7/2002 | Banavar et al. |
| 6,571,278 | B1 | 5/2003 | Negishi et al. |
| 6,574,628 | B1 | 6/2003 | Kahn et al. |
| 6,574,674 | B1 | 6/2003 | May et al. |
| 6,611,955 | B1 | 8/2003 | Logean et al. |
| 6,625,751 | B1* | 9/2003 | Starovic et al. ............... 714/11 |
| 6,668,260 | B2 | 12/2003 | Zoltan |
| 6,757,896 | B1 | 6/2004 | Cohen et al. |
| 6,760,903 | B1* | 7/2004 | Morshed et al. ............ 717/130 |
| 6,775,831 | B1 | 8/2004 | Carrasco et al. |
| 6,779,093 | B1 | 8/2004 | Gupta |
| 6,782,492 | B1 | 8/2004 | Nakaso |
| 6,823,511 | B1 | 11/2004 | McKenney et al. |
| 6,862,608 | B2 | 3/2005 | Buhlman et al. |
| 6,954,794 | B2 | 10/2005 | Rudd et al. |
| 6,968,372 | B1 | 11/2005 | Thompson et al. |
| 7,010,576 | B2 | 3/2006 | Bae |
| 7,020,736 | B1 | 3/2006 | Cherukuri |
| 7,031,989 | B2 | 4/2006 | Elmendorf et al. |
| 7,047,341 | B2 | 5/2006 | Jung |
| 7,047,521 | B2 | 5/2006 | Bunnell |
| 7,058,826 | B2 | 6/2006 | Fung |
| 7,082,604 | B2 | 7/2006 | Schneiderman |
| 7,206,827 | B2 | 4/2007 | Viswanath et al. |
| 2002/0199172 | A1 | 12/2002 | Bunnell |
| 2003/0004924 | A1* | 1/2003 | Williams ..................... 707/1 |
| 2003/0005407 | A1 | 1/2003 | Hines |
| 2003/0067912 | A1 | 4/2003 | Mead et al. |
| 2003/0105816 | A1 | 6/2003 | Goswani |
| 2004/0073828 | A1* | 4/2004 | Bronstein ..................... 714/6 |
| 2004/0093588 | A1 | 5/2004 | Gschwind et al. |
| 2004/0158819 | A1 | 8/2004 | Cuomo et al. |
| 2004/0163077 | A1 | 8/2004 | Dimpsey et al. |
| 2005/0039171 | A1 | 2/2005 | Avakian et al. |
| 2005/0086384 | A1* | 4/2005 | Ernst ......................... 709/248 |
| 2005/0108481 | A1* | 5/2005 | Iyengar et al. ............. 711/141 |
| 2005/0240737 | A1 | 10/2005 | Holt |
| 2005/0257219 | A1 | 11/2005 | Holt |
| 2005/0262313 | A1 | 11/2005 | Holt |
| 2005/0262513 | A1 | 11/2005 | Holt |
| 2006/0020913 | A1 | 1/2006 | Holt |
| 2006/0080389 | A1 | 4/2006 | Powers et al. |
| 2006/0095483 | A1 | 5/2006 | Holt |
| 2006/0143350 | A1* | 6/2006 | Miloushev et al. .......... 710/242 |
| 2006/0167878 | A1* | 7/2006 | Hartman ....................... 707/8 |
| 2006/0242464 | A1 | 10/2006 | Holt |
| 2006/0253844 | A1 | 11/2006 | Holt |
| 2006/0265703 | A1 | 11/2006 | Holt |
| 2006/0265704 | A1 | 11/2006 | Holt |
| 2006/0265705 | A1 | 11/2006 | Holt |
| 2008/0072238 | A1* | 3/2008 | Monnie et al. ............. 719/310 |
| 2008/0189700 | A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19 , Oct. 1998, Fort Lauderdale, FL.

Bal, et al., "Experience with Distributed Programming in Orca", *IEEE CS International Conference on Computer Languages*, pp. 1-23 , Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications on Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9 , Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online] , XP008098868 ISSN: 0302-9743 ISBN: 978-3-540-55940-5—Retrieved from the internet URL:http//www.springerlink.com/content/5v 028411810p6m700/> ,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. Conf. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214 , Sep. 13-15, 1995.

Supplementary European Search Report EP 06 79 0317 Dated Mar. 5, 2009.

* cited by examiner

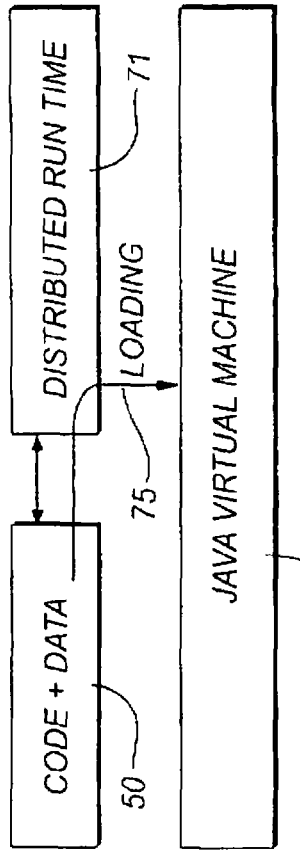
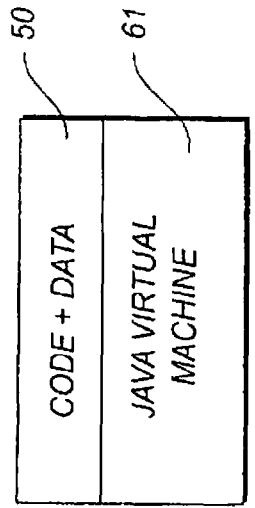
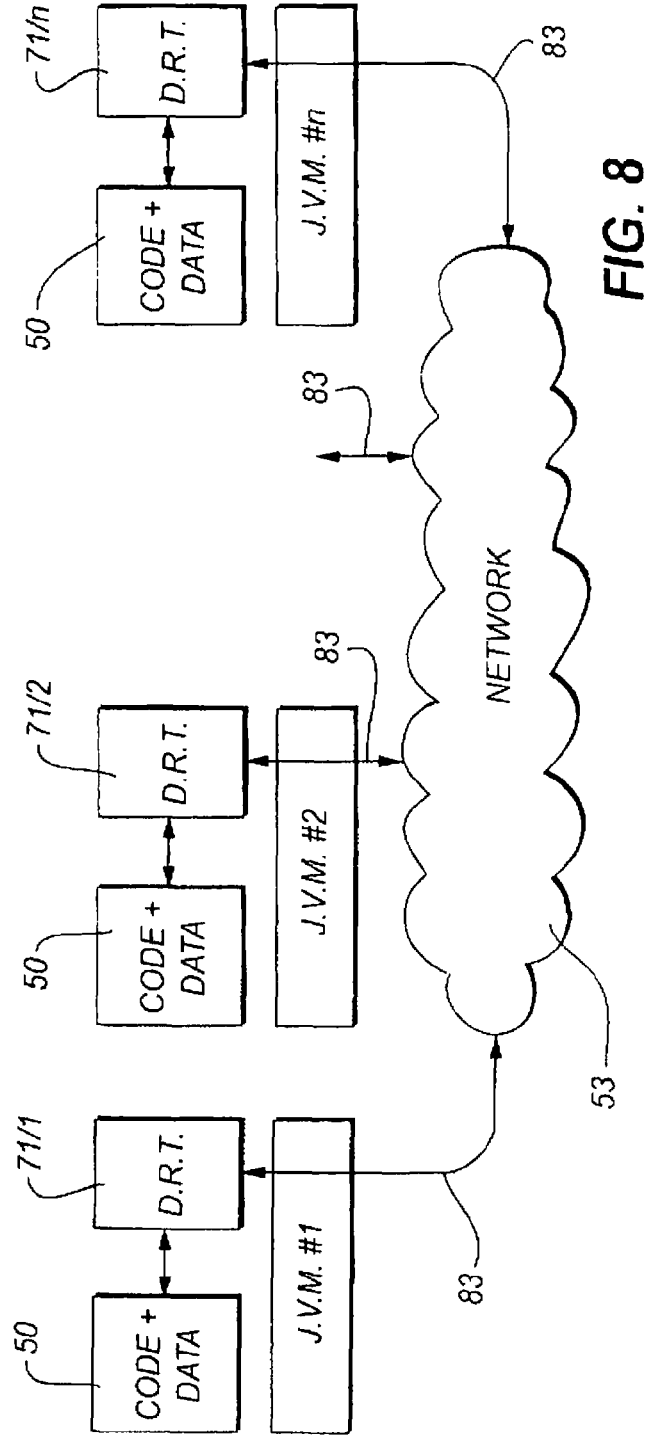

COMPUTER ARCHITECTURE AND METHOD OF OPERATION FOR MULTI-COMPUTER DISTRIBUTED PROCESSING WITH SYNCHRONIZATION

CROSS-REFERENCE TO RELATED APPLICATIONS

Priority

This application is a continuation application and claims the benefit of priority of U.S. patent application Ser. No. 11/259,761, filed Oct. 25, 2005, now abandoned entitled "COMPUTER ARCHITECTURE AND METHOD OF OPERATION FOR MULTI-COMPUTER DISTRIBUTED PROCESSING WITH SYNCHRONIZATION", which is a Continuation-in-Part Application of U.S. patent application Ser. No. 11/111,779 filed 22 Apr. 2005 entitled "MODIFIED COMPUTER ARCHITECTURE WITH SYNCHRONIZATION OF OBJECTS", which is itself a Continuation-in-Part application of U.S. patent application Ser. No. 10/830,042 filed 23 Apr. 2004 entitled "MODIFIED COMPUTER ARCHITECTURE"; each of which applications are hereby incorporated by this reference.

RELATED APPLICATIONS

This application claims the benefit of priority under one or more of 35 U.S.C. 119 and/or 35 U.S.C. 120 to the following Australian Patent Applications, U.S. Utility patent applications and PCT International Patent Applications, each of which is also a related application and each is incorporated herein by reference in its entirety:

U.S. patent application Ser. No. 11/259,634 filed 25 Oct. 2005 entitled "Computer Architecture And Method Of Operation For Multi-Computer Distributed Processing With Replicated Memory";

U.S. patent application Ser. No. 11/259,744 filed 25 Oct. 2005 entitled "Computer Architecture And Method Of Operation For Multi-Computer Distributed Processing With Initialization Of Objects";

U.S. patent application Ser. No. 11/259,762 filed 25 Oct. 2005 entitled "Computer Architecture And Method Of Operation For Multi-Computer Distributed Processing With Finalization Of Objects";

U.S. patent application Ser. No. 11/259,761 filed 25 Oct. 2005 entitled "Computer Architecture And Method Of Operation For Multi-Computer Distributed Processing With Synchronization";

U.S. patent application Ser. No. 11/259,895 filed 25 Oct. 2005 entitled "Computer Architecture And Method Of Operation For Multi-Computer Distributed Processing And Coordinated Memory And Asset Handling ";

Australian Provisional Patent Application No. 2005 902 023 filed 21 Apr. 2005 entitled "Multiple Computer Architecture with Replicated Memory Fields";

Australian Provisional Patent Application No. 2005 902 024 filed 21 Apr. 2005 entitled "Modified Computer Architecture with Initialization of Objects";

Australian Provisional Patent Application No. 2005 902 025 filed 21 Apr. 2005 entitled "Modified Computer Architecture with Finalization of Objects";

Australian Provisional Patent Application No. 2005 902 026 filed 21 Apr. 2005 entitled "Modified Computer Architecture with Synchronization of Objects";

Australian Provisional Patent Application No. 2005 902 027 filed 21 Apr. 2005 entitled "Modified Computer Architecture with Coordinated Objects";

U.S. patent application Ser. No. 11/111,757 filed 22 Apr. 2005 entitled "Multiple Computer Architecture with Replicated Memory Fields";

U.S. patent application Ser. No. 11/111,781 filed 22 Apr. 2005 entitled "Modified Computer Architecture with Initialization of Objects";

U.S. patent application Ser. No. 11/111,778 filed 22 Apr. 2005 entitled "Modified Computer Architecture with Finalization of Objects";

U.S. patent application Ser. No. 11/111,779 filed 22 Apr. 2005 entitled "Modified Computer Architecture with Synchronization of Objects";

U.S. patent application Ser. No. 11/111,946 filed 22 Apr. 2005 entitled "Modified Computer Architecture with Coordinated Objects";

PCT International Application No. PCT/AU05/000/582 filed 22 Apr. 2005 entitled "Multiple Computer Architecture with Replicated Memory Fields";

PCT International Application No. PCT/AU05/000/578 filed 22 Apr. 2005 entitled "Modified Computer Architecture with Initialization of Objects";

PCT International Application No. PCT/AU05/000/581 filed 22 Apr. 2005 entitled "Modified Computer Architecture with Finalization of Objects";

PCT International Application No. PCT/AU05/000/579 filed 22 Apr. 2005 entitled "Modified Computer Architecture with Synchronization of Objects"; and PCT International Application No. PCT/AU05/000/580 filed 22 Apr. 2005 entitled "Modified Computer Architecture with Coordinated Objects".

A further related patent application that is hereby incorporated by reference is U.S. patent application Ser. No. 10/830,042 filed 23 Apr. 2004 entitled "Modified Computer Architecture".

FIELD OF THE INVENTION

The present invention relates to computers and other computing machines and information appliances, in particular, to a modified computer architecture and program structure which enables the operation of an application program concurrently or simultaneously on a plurality of computers interconnected via a communications link using a distributed runtime and enables improved performance to be achieved.

BACKGROUND OF THE INVENTION

Ever since the advent of computers, and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory, however, such stratagems invariably increase the administrative overhead of the machine 1.

Naturally, over the years various attempts have been made to increase machine performance. One approach is to use symmetric multi-processors. This prior art approach has been used in so called "super" computers and is schematically indicated in FIG. 2. Here a plurality of CPU's 12 are connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (i.e. share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 . . . M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, . . . , Mn.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2, . . . , Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

In computer languages such as for example JAVA and MICROSOFT.NET there are two major types of constructs with which programmers deal. In the JAVA language these are known as objects and classes. More generally they may be referred to as assets. Every time an object (or other asset) is created there is an initialization routine run known as an object initialization (e.g., "<init>") routine. Similarly, every time a class is loaded there is a class initialization routine known as "<clinit>". Other languages use different terms but utilize a similar concept. In either case, however, there is no equivalent "clean up" or deletion routine to delete an object or class (or other asset) once it is no longer required. Instead, this "clean up" happens unobtrusively in a background mode.

Furthermore, in any computer environment it is necessary to acquire and release a lock to enable the use of such objects, classes, assets, resources or structures to avoid different parts of the application program from attempting to use the same objects, classes, assets, resources or structures at the one time. In the JAVA environment this is known as synchronization. Synchronization more generally refers to the exclusive use of an object, class, resource, structure, or other asset to avoid contention between and among computers or machines. This is achieved in JAVA by the "monitor enter" and "monitor exit" instructions or routines. Other languages use different terms but utilize a similar concept.

Unfortunately, conventional computing systems, architectures, and operating schemes do not provide for computing environments and methods in which an application program can operate simultaneously on an arbitrary plurality of computers where the environment and operating scheme ensure that the abovementioned memory management, initialization, clean up and synchronization procedures operate in a consistent and coordinated fashion across all the computing machines.

SUMMARY

The present invention discloses a computing environment in which an application program operates simultaneously on a plurality of computers. In such an environment it is advantageous to ensure that the abovementioned asset initialization, clean-up and synchronization procedures operate in a consistent and coordinated fashion across all the machines.

In accordance with a first aspect of the present invention there is disclosed a multiple computer system having at least one application program each written to operate on only a single computer but running simultaneously on a plurality of computers interconnected by a communications network, wherein different portions of said application program(s) execute substantially simultaneously on different ones of said computers, wherein each computer has an independent local memory accessible only by the corresponding portion of said application program(s) and wherein for each said portion a like plurality of substantially identical objects are created, each in the corresponding computer.

In accordance with a second aspect of the present invention there is disclosed A plurality of computers interconnected via a communications link and each having an independent local memory and substantially simultaneously operating a different portion at least one application program each written to operate on only a single computer, each local memory being accessible only by the corresponding portion of said application program.

In accordance with a third aspect of the present invention there is disclosed a method of running simultaneously on a plurality of computers at least one application program each written to operate on only a single computer, said computers being interconnected by means of a communications network and each having an independent local memory, said method comprising the step of: (i) executing different portions of said application program(s) on different ones of said computers and for each said portion creating a like plurality of substantially identical objects each in the corresponding computer and each accessible only by the corresponding portion of said application program.

In accordance with a fourth aspect of the present invention there is disclosed a method of loading an application program written to operate only on a single computer onto each of a plurality of computers, the computers being interconnected via a communications link, and different portions of said application program(s) being substantially simultaneously executable on different computers with each computer having an independent local memory accessible only by the corresponding portion of said application program(s), the method comprising the step of modifying the application before, during, or after loading and before execution of the relevant portion of the application program.

In accordance with a fifth aspect of the present invention there is disclosed a method of operating simultaneously on a plurality of computers all interconnected via a communications link at least one application program each written to operate on only a single computer, each of said computers having at least a minimum predetermined local memory capacity, different portions of said application program(s) being substantially simultaneously executed on different ones of said computers with the local memory of each computer being only accessible by the corresponding portion of said application program(s), said method comprising the steps of: (i) initially providing each local memory in substantially identical condition, (ii) satisfying all memory reads and writes generated by each said application program portion from said corresponding local memory, and (iii) communicating via said communications link all said memory writes at each said computer which take place locally to all the remainder of said plurality of computers whereby the contents of the local memory utilised by each said computer, subject to an updating data transmission delay, remains substantially identical.

In accordance with a sixth aspect of the present invention there is disclosed A method of compiling or modifying an application program written to operate on only a single computer but to run simultaneously on a plurality of computers interconnected via a communications link, with different portions of said application program(s) executing substantially simultaneously on different ones of said computers each of which has an independent local memory accessible only by the corresponding portion of said application program, said method comprising the steps of: (i) detecting instructions which share memory records utilizing one of said computers, (ii) listing all such shared memory records and providing a naming tag for each listed memory record, (iii) detecting those instructions which write to, or manipulate the contents of, any of said listed memory records, and (iv) activating an updating propagation routine following each said detected write or manipulate instruction, said updating propagation routine forwarding the re-written or manipulated contents and name tag of each said re-written or manipulated listed memory record to the remainder of said computers.

In accordance with a seventh aspect of the present invention there is disclosed in a multiple thread processing computer operation in which individual threads of a single application program written to operate on only a single computer are simultaneously being processed each on a different corresponding one of a plurality of computers each having an independent local memory accessible only by the corresponding thread and each being interconnected via a communications link, the improvement comprising communicating changes in the contents of local memory physically associated with the computer processing each thread to the local memory of each other said computer via said communications link.

In accordance with a eighth aspect of the present invention there is disclosed a multiple computer system having at least one application program each written to operate on only a single computer but running simultaneously on a plurality of computers interconnected by a communications network, wherein different portions of said application program(s) execute substantially simultaneously on different ones of said computers and for each portion a like plurality of substantially identical objects are created, each in the corresponding computer and each having a substantially identical name, and said system including a lock mechanism or lock means applicable to all said computers wherein any computer wishing to utilize a named object therein acquires an authorizing lock from said lock means which permits said utilization and which prevents all the other computers from utilizing their corresponding named object until said authorizing lock is relinquished.

In accordance with a ninth aspect of the present invention there is disclosed a plurality of computers interconnected via a communications link and operating simultaneously at least one application program each written to operate on only a single computer, wherein each said computer substantially simultaneously executes a different portion of said application program(s), each said computer in operating its application program portion utilizes an object only in local memory physically located in each said computer, the contents of the local memory utilized by each said computer is fundamentally similar but not, at each instant, identical, and every one of said computers has an acquire lock routine and a release lock routine which permit utilization of the local object only by one computer and each of the remainder of said plurality of computers is locked out of utilization of their corresponding object.

In accordance with a tenth aspect of the present invention there is disclosed a method of running simultaneously on a plurality of computers at least one application program each written to operate only on a single computer, said computers being interconnected by means of a communications network, said method comprising the steps of: (i) executing different portions of said application program(s) on different ones of said computers and for each said portion creating a like plurality of substantially identical objects each in the corresponding computer and each having a substantially identical name, and (ii) requiring any of said computers wishing to utilize a named object therein to acquire an authorizing lock which permits said utilization and which prevents all the other computers from utilizing their corresponding named object until said authorizing lock is relinquished.

In accordance with a eleventh aspect of the present invention there is disclosed a method of ensuring consistent synchronization of an application program written to operate only on a single computer but different portions of which are to be executed substantially simultaneously each on a different one of a plurality of computers interconnected via a communications network, said method comprising the steps of: (i) scrutinizing said application program at, or prior to, or after loading to detect each program step defining an synchronization routine, and (ii) modifying said synchronization routine to ensure utilization of an object by only one computer and preventing all the remaining computers from simultaneously utilizing their corresponding objects.

In accordance with a twelfth aspect of the present invention there is disclosed a multiple thread processing computer operation in which individual threads of a single application program written to operate only on a single computer are simultaneously being processed each on a corresponding different one of a plurality of computers interconnected via a communications link, and in which objects in local memory physically associated with the computer processing each thread have corresponding objects in the local memory of each other said computer, the improvement comprising permitting only one of said computers to utilize an object and preventing all the remaining computers from simultaneously utilizing their corresponding object.

In accordance with a thirteenth aspect of the present invention there is disclosed a computer program product comprising a set of program instructions stored in a storage medium and operable to permit a plurality of computers to carry out the above-mentioned methods.

In accordance with a fourteenth aspect of the invention there is disclosed a distributed run time and distributed run time system adapted to enable communications between a plurality of computers, computing machines, or information appliances.

In accordance with a fifteenth aspect of the invention there is disclosed a modifier, modifier means, and modifier routine for modifying an application program written to execute on a single computer or computing machine at a time to execute simultaneously on a plurality of networked computers or computing machines, distributed run time and distributed run time system adapted to enable communications between a plurality of computers, computing machines, or information appliances.

In accordance with a sixteenth aspect of the present invention there is disclosed a computer program and computer program product written to operate on only a single computer but product comprising a set of program instructions stored in a storage medium and operable to permit a plurality of computers to carry out the abovementioned procedures, routines, and methods.

BRIEF DESCRIPTION OF THE DRAWINGS

Embodiments of the present invention are now described with reference to the drawings in which:

FIG. 6 is a schematic illustration of a prior art computer arranged to operate JAVA code and thereby constitute a JAVA virtual machine;

FIG. 7 is a drawing similar to FIG. 6 but illustrating the initial loading of code in accordance with the preferred embodiment;

FIG. 8 is a drawing similar to FIG. 5 but illustrating the interconnection of a plurality of computers each operating JAVA code in the manner illustrated in FIG. 7;

Figure 1:
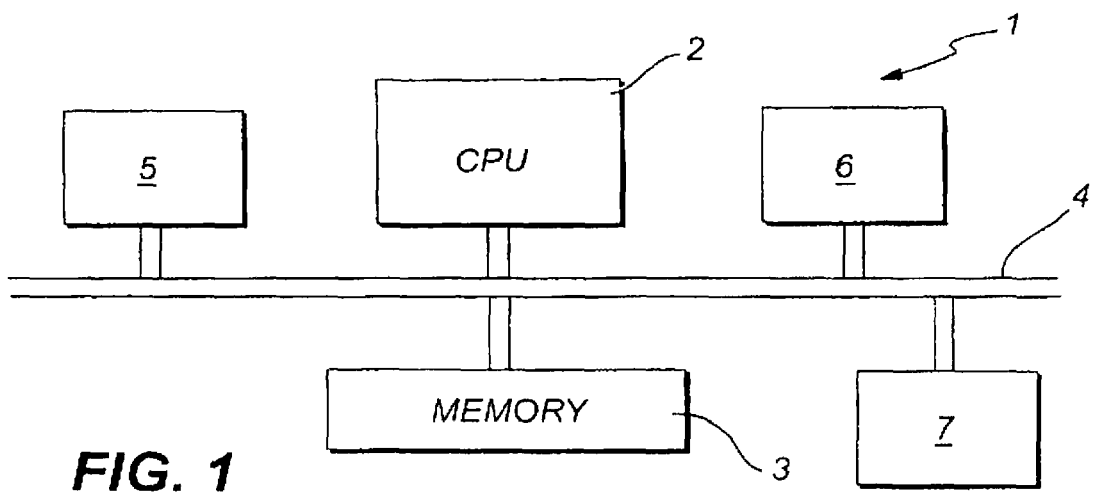
FIG. 1 is a schematic view of the internal architecture of a conventional computer.

The specification includes Annexures A and D which provide actual program fragments which implement various aspects of the described embodiments. Annexure A relates to fields and Annexure D to synchronization.

REFERENCE TO ANNEXES

Although the specification provides a complete and detailed description of the several embodiments of the invention such that the invention may be understood and implemented without reference to other materials, the specification does includes Annexures A and D which provide exemplary actual program or code fragments which implement various aspects of the described embodiments. Although aspects of the invention are described throughout the specification including the Annexes, drawings, and claims, it may be appreciated that Annexure A relates primarily to fields and Annexure D relates primarily to synchronization.

It will be appreciated in light of the description provided here that the categorization of the Annexures as well as the use of other headings and subheadings in this description is intended as an aid to the reader and is not to be used to limit the scope of the invention in any way.

DETAILED DESCRIPTION OF EMBODIMENTS OF THE INVENTION

The present invention discloses a modified computer architecture which enables an applications program to be run simultaneously on a plurality of computers in a manner that overcomes the limitations of the aforedescribed conventional architectures, systems, methods, and computer programs.

In one aspect, shared memory at each computer may be updated with amendments and/or overwrites so that all memory read requests are satisfied locally. Before, during or after program loading, but before execution of relevant portions of the program code are executed, or similar, instructions which result in memory being re-written or manipulated are identified. Additional instructions are inserted into the program code (or other modification made) to cause the equivalent memory locations at all computers to be updated. While the invention is not limited to JAVA language or virtual machines, exemplary embodiments are described relative to the JAVA language and standards.

In another aspect, the initialization of JAVA language classes and objects (or other assets) are provided for so all memory locations for all computers are initialized in the same manner. In another aspect, the finalization of JAVA language classes and objects is also provide so finalization only occurs when the last class or object present on all machines is no longer required. In still another aspect, synchronization is provided such that instructions which result in the application program acquiring (or releasing) a lock on a particular asset (synchronization) are identified. Additional instructions are inserted (or other code modifications performed) to result in a modified synchronization routine with which all computers are updated.

As will become more apparent in light of the further description provided herein, one of the features of the invention is to make it appear that one common application program or application code and its executable version (with likely modification) is simultaneously or concurrently executing across a plurality of computers or machines M1, . . . , Mn. As will be described in considerable detail hereinafter, the instant invention achieves this by running the same application program (for example, Microsoft Word or Adobe Photoshop CS2) on each machine, but modifying the executable code of that application program on each machine as necessary such that each executing instance ('copy') on each machine coordinates its local operations on any particular machine with the operations of the respective instances on the other machines such that they all function together in a consistent, coherent and coordinated manner and give the appearance of being one global instance of the application (i.e., a "meta-application").

In accordance with embodiments of the present invention a single application code 50 (sometimes more informally referred to as the application or the application program) can be operated simultaneously on a number of machines M1, M2 . . . Mn interconnected via a communications network or other communications link or path 53. The communications network or path may be any electronic signaling, data, or digital communications network or path and may advantageously be a relatively slow speed communications path, such as a network connection over the Internet or any common networking configurations known or available as of the date or this applications, and extensions and improvements, thereto.

By way of example but not limitation, one application code or program 50 may be a single application on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one" application code or program and a "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, and with some restrictions after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 (in some embodiments implemented as a distributed run time or DRT 71) on each machine M1, M2, . . . , Mn and thus all of the machines M1, M2 . . . Mn have the same (or substantially the same or similar) modifier 51 for each modification required. Different modification for example may be required for memory management and replication, initialization, finalization, and/or synchronization (though not all of these modification types may be required for all embodiments).

In addition, during the loading of, or at any time preceding the execution of, the application code 50 (or relevant portion thereof) on each machine M1, M2 . . . Mn, each application code 50 has been modified by the corresponding modifier 51 according to the same rules (or substantially the same rules since minor optimizing changes are permitted within each modifier 51/1, 51/2, . . . , 51/n).

With reference to any synchronization modifier that may be present, such synchronization modifier 51-S or DRT 71-S or other code modifying means is responsible for ensuring that when a part (such as a thread or process) of the modified application program 50 running on one or more of the machines exclusively utilizes (e.g., by means of a synchronization routine or similar or equivalent mutual exclusion operator or operation) a particular local asset, such as an objects 50X-50Z or class 50A, no other different and potentially concurrently executing part on machines M2 . . . Mn exclusively utilizes the similar equivalent corresponding asset in its local memory at once or at the same time.

These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Attention is now directed to the particulars of several aspects of the invention that may be utilised alone or in any combination.

Figure 5:
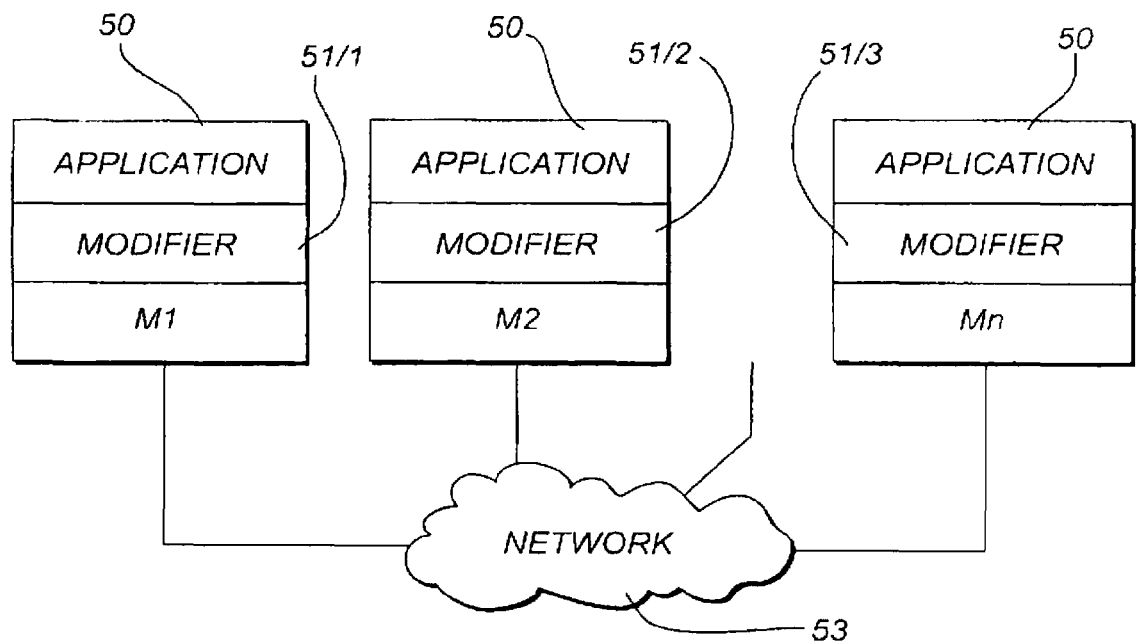
FIG. 5 is a schematic block diagram of a plurality of machines operating the same application program in accordance with a first embodiment of the present invention.

In connection with FIG. 5, in accordance with a preferred embodiment of the present invention a single application code 50 (sometimes more informally referred to as the application or the application program) can be operated simultaneously on a number of machines M1, M2 . . . Mn interconnected via a communications network or other communications link or path 53. By way of example but not limitation, one application code or program 50 would be a single common application program on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one", "single", and "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, or after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 on each machine M1, M2, . . . , Mn and thus all of the machines M1, M2 . . . Mn have the same (or substantially the same or similar) modifier 51 with the modifier of machine M1 being designated 51/1 and the modifier of machine M2 being designated 51/2, etc. In addition, before or during the loading of, or preceding the execution of, or even after execution has commenced, the application code 50 on each machine M1, M2 . . . Mn is modified by the corresponding modifier 51 according to the same rules (or substantially the same rules since minor optimizing changes are permitted within each modifier 51/1, 51/2, . . . , 51/n).

As will become more apparent in light of the further description provided herein, one of the features of the invention is to make it appear that one application program instance of application code 50 is executing simultaneously across all of the plurality of machines M1, M2, . . . , Mn. As will be described in considerable detail hereinafter, the instant invention achieves this by running the same application program code (for example, Microsoft Word or Adobe Photoshop CS2) on each machine, but modifying the executable code of that application program on each machine such that each executing occurrence (or 'local instance') on each one of the machines M1 . . . Mn coordinates its local operations with the operations of the respective occurrences on each one of the other machines such that each occurrence on each one of the plurality of machines function together in a consistent, coherent and coordinated manner so as to give the appearance of being one global instance (or occurrence) of the application program and program code (i.e., a "meta-application").

As a consequence of the above described arrangement, if each of the machines M1, M2, . . . , Mn has, say, an internal memory capability of 10 MB, then the total memory available to each application code 50 is not necessarily, as one might expect the number of machines (n) times 10 MB, or alternatively the additive combination of the internal memory capability of all n machines, but rather or still may only be 10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as a 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has an private (i.e. 'non-common') internal memory capability. The private internal memory capability of the machines M1, M2, . . . , Mn are normally approximately equal but need not be. It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation of the invention.

It is known from the prior art to operate a single computer or machine (produced by one of various manufacturers and having an operating system operating in one of various different languages) in a particular language of the application, by creating a virtual machine as schematically illustrated in FIG. 6. The code and data and virtual machine configuration or arrangement of FIG. 6 takes the form of the application code 50 written in the Java language and executing within a Java Virtual Machine 61. Thus, where the intended language of the application is the language JAVA, a JAVA virtual machine is used which is able to operate code in JAVA irrespective of the machine manufacturer and internal details of the machine. For further details see "The JAVA Virtual Machine Specification" $2^{nd}$ Edition by T. Lindholm & F. Yellin of Sun Microsystems Inc. of the USA, which is incorporated by reference herein.

This conventional art arrangement of FIG. 6 is modified in accordance with embodiments of the present invention by the provision of an additional facility which is conveniently termed "distributed run time" or "distributed run time system" DRT 71 and as seen in FIG. 7.

In FIG. 7, the application code 50 is loaded onto the Java Virtual Machine 72 in cooperation with the distributed runtime system 71, through the loading procedure indicated by arrow 75. As used herein the terms distributed runtime and the distributed run time system are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. The runtime system typically deals with the details of the interface between the program and the operation system such as system calls, program start-up and termination, and memory management. For purposes of background, a conventional Distributed Computing Environment (DCE) that does not provide the capabilities of the inventive distributed run time or distributed run time system 71 required in the invention is available from the Open Software Foundation. This Distributed Computing Environment (DCE) performs a form of computer-to-computer communication for software running on the machines, but among its many limitations, it is not able to implement the modification or communication operations of this invention. Among its functions and operations, the inventive DRT 71 coordinates the particular communications between the plurality of machines M1, M2, . . . , Mn. Moreover, the inventive distributed runtime 71 comes into operation during the loading procedure indicated by arrow 75 of the JAVA application 50 on each JAVA virtual machine 72 of machines JVM#1, JVM#2, . . . JVM#n. The sequence of operations during loading will be described hereafter in relation to FIG. 9. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine, or operating environment.

FIG. 8 shows in modified form the arrangement of FIG. 5 utilising JAVA virtual machines, each as illustrated in FIG. 7. It will be apparent that again the same application code 50 is loaded onto each machine M1, M2 . . . Mn. However, the communications between each machine M1, M2, . . . , Mn, and indicated by arrows 83, although physically routed through the machine hardware, are advantageously controlled by the individual DRT's 71/1 . . . 71/n within each machine. Thus, in practice this may be conceptionalised as the DRT's 71/1, . . . , 71/n communicating with each other via the network or other communications link 73 rather than the machines M1, M2, . . . , Mn communicating directly with themselves or each other. Actually, the invention contemplates and included either this direct communication between machines M1, M2, . . . , Mn or DRTs 71/1, 71/2, . . . , 71/n or a combination of such communications. The inventive DRT 71 provides communication that is transport, protocol, and link independent.

It will be appreciated in light of the description provided herein that there are alternative implementations of the modifier 51 and the distributed run time 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

However, in the arrangement illustrated in FIG. 8, (and also in FIGS. 31-32), a plurality of individual computers or machines M1, M2, . . . , Mn are provided, each of which are interconnected via a communications network 53 or other communications link and each of which individual computers or machines provided with a modifier 51 (See in FIG. 5) and realised by or in for example the distributed run time (DRT) 71 (See FIG. 8) and loaded with a common application code 50. The term common application program is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50, and this single copy or perhaps a plurality of identical copies are modified to generate a modified copy or version of the application program or program code, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

Essentially in at least one embodiment the modifier 51 or DRT 71 or other code modifying means is responsible for modifying the application code 50 so that it may execute memory manipulation operations, such as memory putstatic and putfield instructions in the JAVA language and virtual machine environment, in a coordinated, consistent, and coherent manner across and between the plurality of individual machines M1 . . . Mn. It follows therefore that in such a computing environment it is necessary to ensure that each of memory location is manipulated in a consistent fashion (with respect to the others).

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

A machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

Figure 9:
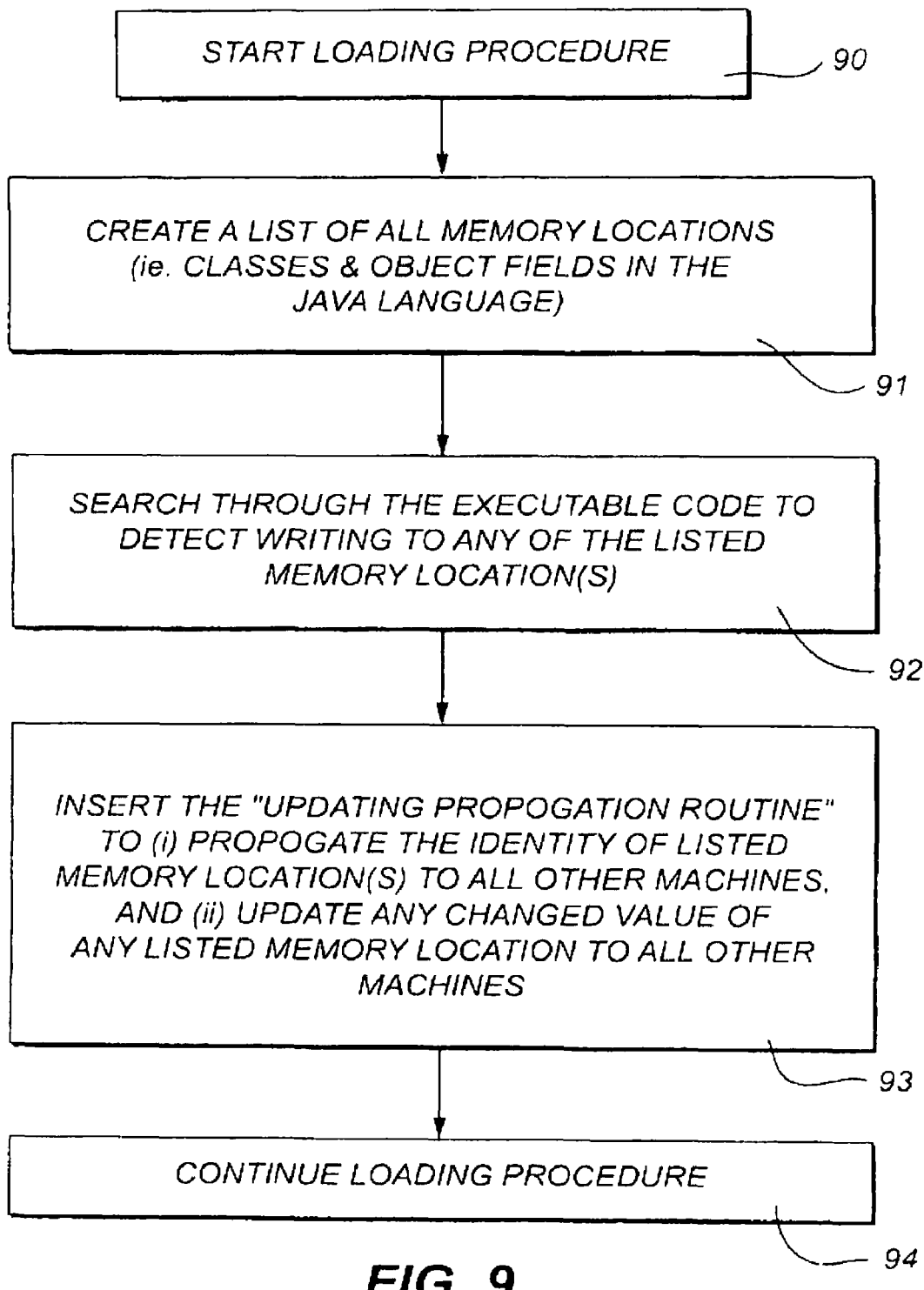
FIG. 9 is a flow chart of the procedure followed during loading of the same application on each machine in the network.

Turning now to FIGS. 7 and 9, during the loading procedure 75, the application code 50 being loaded onto or into each JAVA virtual machine 72 is modified by DRT 71. This modification commences at Step 90 in FIG. 9 and involves the initial step 91 of preferably scrutinizing or analysing the code and detecting all memory locations addressable by the application code 50, or optionally some subset of all memory locations addressable by the application code 50; such as for example named and unnamed memory locations, variables (such as local variables, global variables, and formal arguments to subroutines or functions), fields, registers, or any other address space or range of addresses which application code 50 may access. Such memory locations in some instances need to be identified for subsequent processing at steps 92 and 93. In some embodiments, where a list of detected memory locations is required for further processing, the DRT 71 during the loading procedure 75 creates a list of all the memory locations thus identified. In one embodiment, the memory locations in the form of JAVA fields are listed by object and class, however, the memory locations, fields, or the like may be listed or organized in any manner so long as they comport with the architectural and programming requirements of the system on which the program is to be used and the principles of the invention described herein. This detection is optional and not required in all embodiments of the invention. It may be noted that the DRT is at least in part fulfilling the roll of the modifier 51.

The next phase (designated Step 92 in FIG. 9) [Step 92] of the modification procedure is to search through the application code 50 in order to locate processing activity or activities that manipulate or change values or contents of any listed memory location (for example, but not limited to JAVA fields) corresponding to the list generated at step 91 when required. Preferably, all processing activities that manipulate or change any one or more values or contents of any one or more listed memory locations, are located.

When such a processing activity or operation (typically "putstatic" or "putfield" in the JAVA language, or for example, a memory assignment operation, or a memory write operation, or a memory manipulation operation, or more generally operations that otherwise manipulate or change value(s) or content(s) of memory or other addressable areas), is detected which changes the value or content of a listed or detected memory location, then an "updating propagation routine" is inserted by step 93 in the application code 50 corresponding to the detected memory manipulation operation, to communicate with all other machines in order to notify all other machines of the identity of the manipulated memory location, and the updated, manipulated or changed value(s) or content(s) of the manipulated memory location. The inserted "updating propagation routine" preferably takes the form of a method, function, procedure, or similar subroutine call or operation to a network communications library of DRT 71. Alternatively, the "updating propagation routine" may take the optional form of a code-block (or other inline code form) inserted into the application code instruction stream at, after, before, or otherwise corresponding to the detected manipulation instruction or operation. And preferably, in a multi-tasking or parallel processing machine environment (and in some embodiments inclusive or exclusive of operating system), such as a machine environment capable of potentially simultaneous or concurrent execution of multiple or different threads or processes, the "updating propagation routine" may execute on the same thread or process or processor as the detected memory manipulation operation of step 92. Thereafter, the loading procedure continues, by loading the modified application code 50 on the machine 72 in place of the unmodified application code 50, as indicated by step 94 in FIG. 9.

Figure 10:
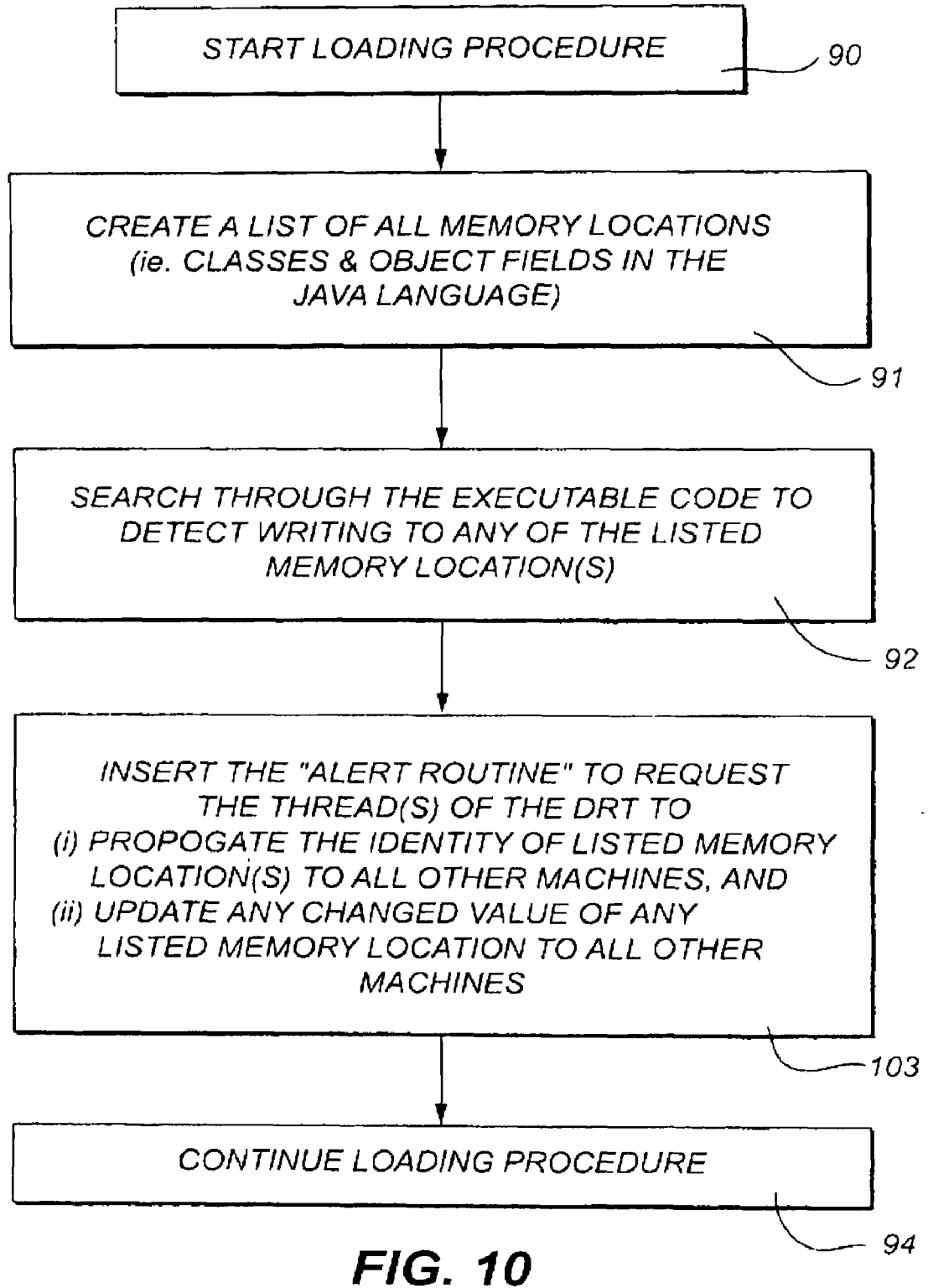
FIG. 10 is a flow chart showing a modified procedure similar to that of FIG. 9.

An alternative form of modification during loading is illustrated in the illustration of FIG. 10. Here the start and listing steps 90 and 91 and the searching step 92 are the same as in FIG. 9. However, rather than insert the "updating propagation routine" into the application code 50 corresponding to the detected memory manipulation operation identified in step 92, as is indicated in step 93, in which the application code 50, or network communications library code 71 of the DRT executing on the same thread or process or processor as the detected memory manipulation operation, carries out the updating, instead an "alert routine" is inserted corresponding to the detected memory manipulation operation, at step 103. The "alert routine" instructs, notifies or otherwise requests a different and potentially simultaneously or concurrently executing thread or process or processor not used to perform the memory manipulation operation (that is, a different thread or process or processor than the thread or process or processor which manipulated the memory location), such as a different thread or process allocated to the DRT 71, to carry out the notification, propagation, or communication of all other machines of the identity of the manipulated memory location, and the updated, manipulated or changed value(s) or content(s) of the manipulated memory location.

Figure 11:
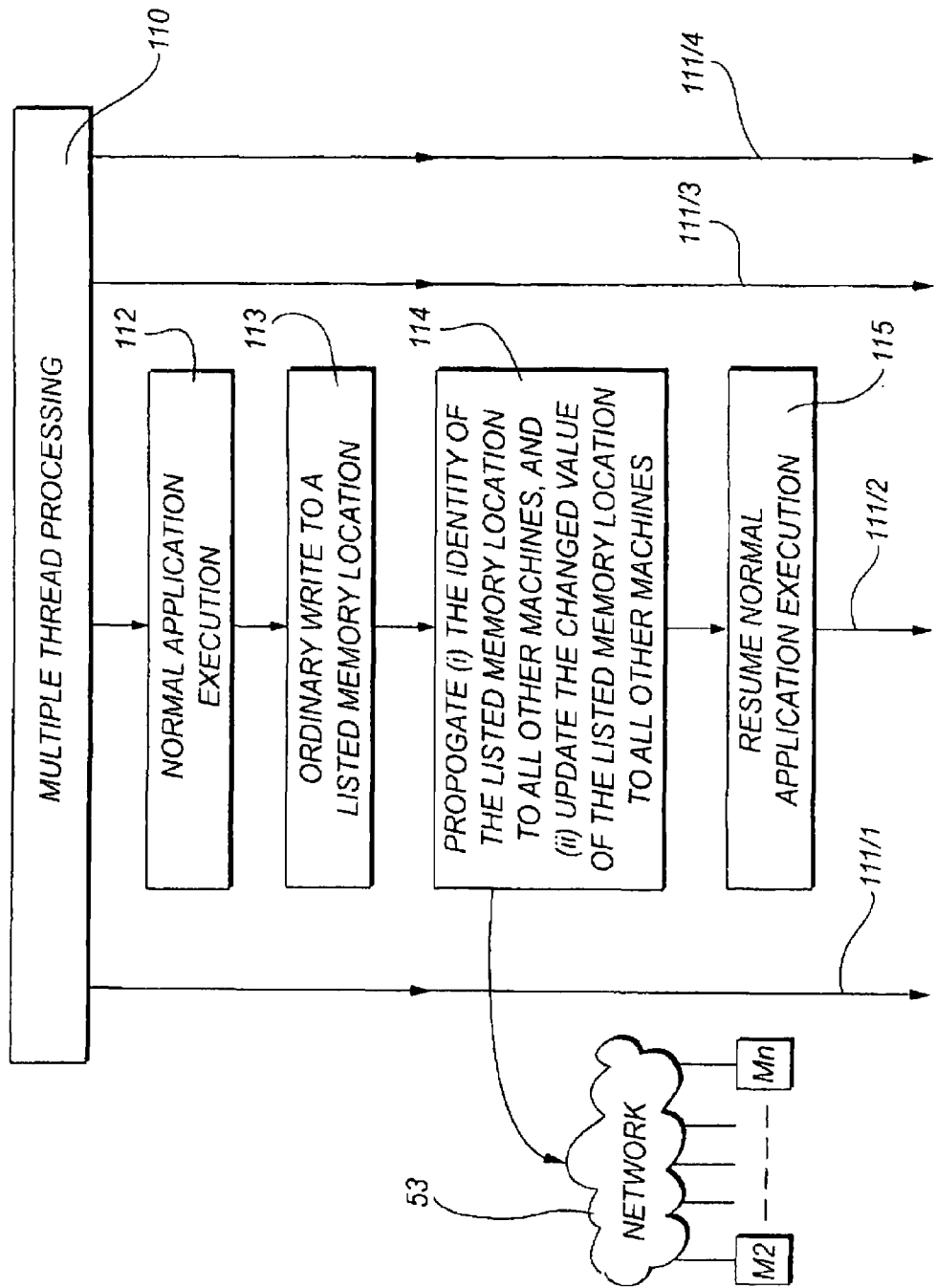
FIG. 11 is a schematic representation of multiple thread processing carried out on the machines of FIG. 8 utilizing a first embodiment of memory updating.
Figure 12:
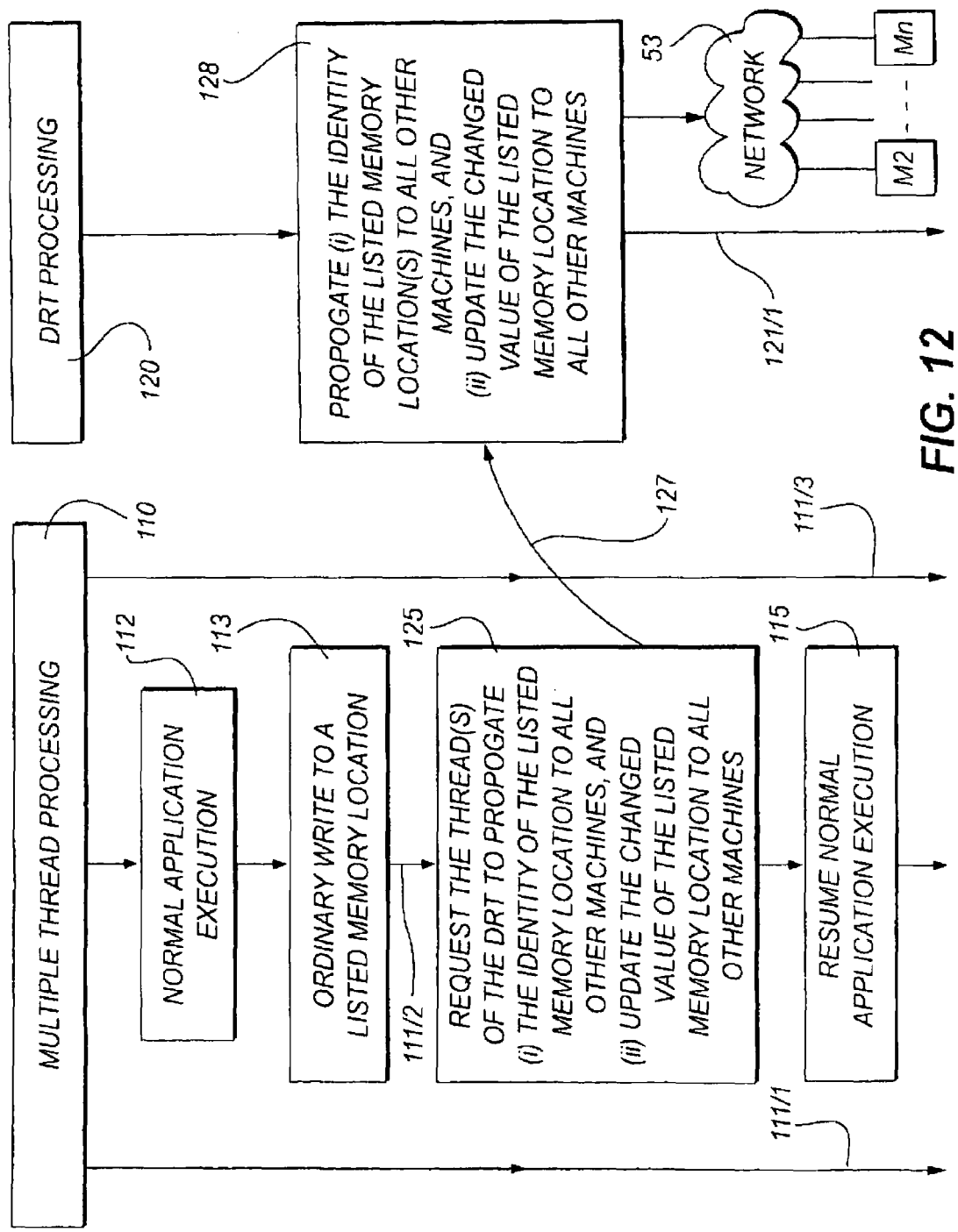
FIG. 12 is a schematic representation similar to FIG. 11 but illustrating an alternative embodiment.

Once this modification during the loading procedure has taken place and execution begins of the modified application code 50, then either the steps of FIG. 11 or FIG. 12 take place. FIG. 11 (and the steps 112, 113, 114, and 115 therein) correspond to the execution and operation of the modified application code 50 when modified in accordance with the procedures set forth in and described relative to FIG. 9. FIG. 12 on the other hand (and the steps 112, 113, 125, 127, and 115 therein) set forth therein correspond to the execution and operation of the modified application code 50 when modified in accordance with FIG. 10.

This analysis or scrutiny of the application code 50 can may take place either prior to loading the application program code 50, or during the application program code 50 loading procedure, or even after the application program code 50 loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary-code languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.ClassLoader loadClass method (e.g., "java.lang.ClassLoader.loadClass( )").

Alternatively, the analysis or scrutiny of the application code 50 may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

As seen in FIG. 11, a multiple thread processing machine environment 110, on each one of the machines M1, . . . , Mn and consisting of threads 111/1 . . . 111/4 exists. The processing and execution of the second thread 111/2 (in this example) results in that thread 111/2 manipulating a memory location at step 113, by writing to a listed memory location. In accordance with the modifications made to the application code 50 in the steps 90-94 of FIG. 9, the application code 50 is modified at a point corresponding to the write to the memory location of step 113, so that it propagates, notifies, or communicates the identity and changed value of the manipulated memory location of step 113 to the other machines M2, . . . , Mn via network 53 or other communication link or path, as indicated at step 114. At this stage the processing of the application code 50 of that thread 111/2 is or may be altered and in some instances interrupted at step 114 by the executing of the inserted "updating propagation routine", and the same thread 111/2 notifies, or propagates, or communicates to all other machines M2, . . . , Mn via the network 53 or other communications link or path of the identity and changed value of the manipulated memory location of step 113. At the end of that notification, or propagation, or communication procedure 114, the thread 111/2 then resumes or continues the processing or the execution of the modified application code 50 at step 115.

In the alternative arrangement illustrated in FIG. 12, a multiple thread processing machine environment 110 comprising or consisting of threads 111/1, . . . , 111/3, and a simultaneously or concurrently executing DRT processing environment 120 consisting of the thread 121/1 as illustrated, or optionally a plurality of threads, is executing on each one of the machines M1, . . . Mn. The processing and execution of the modified application code 50 on thread 111/2 results in a memory manipulation operation of step 113, which in this instance is a write to a listed memory location. In accordance with the modifications made to the application code 50 in the steps 90, 91, 92, 103, and 94 of FIG. 9, the application code 50 is modified at a point corresponding to the write to the memory location of step 113, so that it requests or otherwise notifies the threads of the DRT processing environment 120 to notify, or propagate, or communicate to the other machines M2, . . . , Mn of the identity and changed value of the manipulated memory location of step 113, as indicated at steps 125 and 128 and arrow 127. In accordance with this modification, the thread 111/2 processing and executing the modified application code 50 requests a different and potentially simultaneously or concurrently executing thread or process (such as thread 121/1) of the DRT processing environment 120 to notify the machines M2, . . . , Mn via network 53 or other communications link or path of the identity and changed value of the manipulated memory location of step 113, as indicated in step 125 and arrow 127. In response to this request of step 125 and arrow 127, a different and potentially simultaneously or concurrently executing thread or process 121/1 of the DRT processing environment 120 notifies the machines M2, . . . , Mn via network 53 or other communications link or path of the identity and changed value of the manipulated memory location of step 113, as requested of it by the modified application code 50 executing on thread 111/2 of step 125 and arrow 127.

Figure 2:
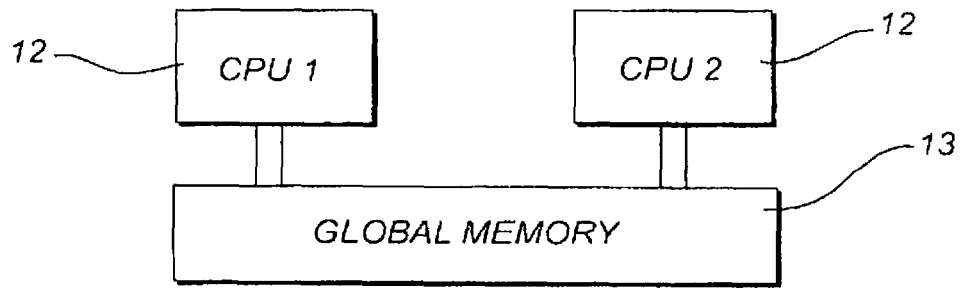
FIG. 2 is a schematic illustration showing the internal architecture of known symmetric multiple processors.

When compared to the earlier described step 114 of thread 111/2 of FIG. 11, step 125 of thread 111/2 of FIG. 12 can be carried out quickly, because step 114 of thread 111/2 must notify and communicate with machines M2, . . . , Mn via the relatively slow network 53 (relatively slow for example when compared to the internal memory bus 4 of FIG. 1 or the global memory 13 of FIG. 2) of the identity and changed value of the manipulated memory location of step 113, whereas step 125 of thread 111/2 does not communicate with machines M2, . . . , Mn via the relatively slow network 53. Instead, step 125 of thread 111/2 requests or otherwise notifies a different and potentially simultaneously or concurrently executing thread 121/1 of the DRT processing environment 120 to perform the notification and communication with machines M2, . . . , Mn via the relatively slow network 53 of the identify and changed value of the manipulated memory location of step 113, as indicated by arrow 127. Thus thread 111/2 carrying out step 125 is only interrupted momentarily before the thread 111/2 resumes or continues processing or execution of modified application code in step 115. The other thread 121/1 of the DRT processing environment 120 then communicates the identity and changed value of the manipulated memory location of step 113 to machines M2, . . . , Mn via the relatively slow network 53 or other relatively slow communications link or path.

This second arrangement of FIG. 12 makes better utilisation of the processing power of the various threads 111/1 . . . 111/3 and 121/1 (which are not, in general, subject to equal demands). Irrespective of which arrangement is used, the identity and change value of the manipulated memory location(s) of step 113 is (are) propagated to all the other machines M2 . . . Mn on the network 53 or other communications link or path.

Figure 13:
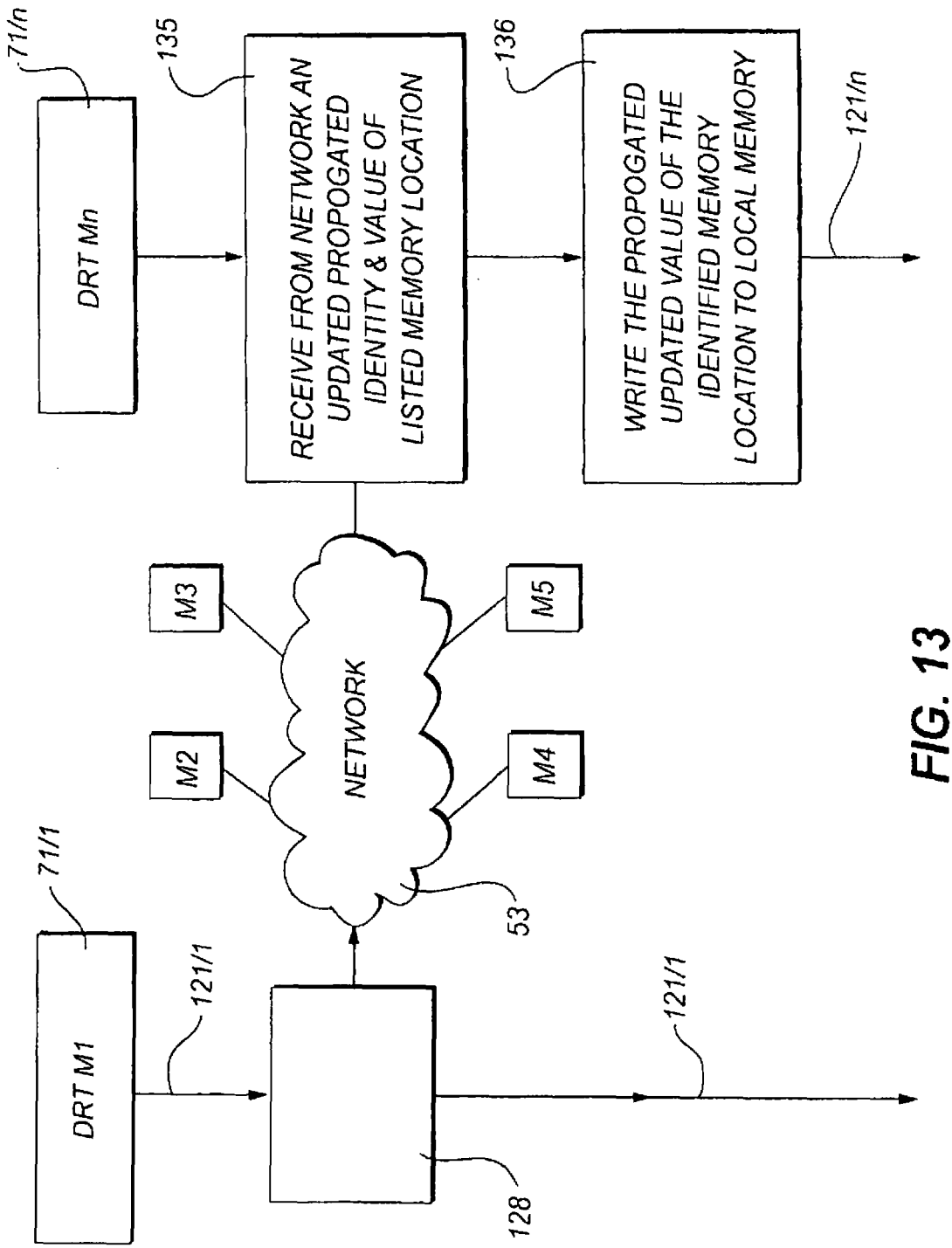
FIG. 13 illustrates multi-thread memory updating for the computers of FIG. 8.

This is illustrated in FIG. 13 where step 114 of FIG. 11, or the DRT 71/1 (corresponding to the DRT processing environment 120 of FIG. 12) and its thread 121/1 of FIG. 12 (represented by step 128 in FIG. 13), send, via the network 53 or other communications link or path, the identity and changed value of the manipulated memory location of step 113 of FIGS. 11 and 12, to each of the other machines M2, . . . , Mn.

With reference to FIG. 13, each of the other machines M2, . . . , Mn carries out the action of receiving from the network 53 the identity and changed value of, for example, the manipulated memory location of step 113 from machine M1, indicated by step 135, and writes the value received at step 135 to the local memory location corresponding to the identified memory location received at step 135, indicated by step 136.

Figure 3:
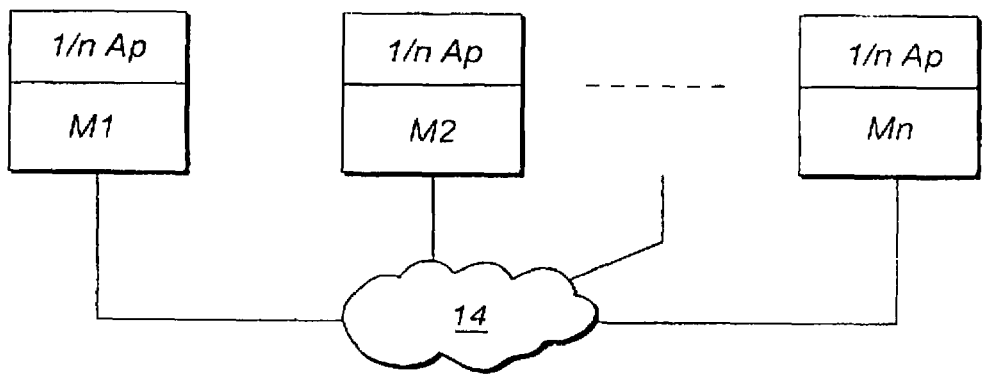
FIG. 3 is a schematic representation of prior art distributed computing.
Figure 4:
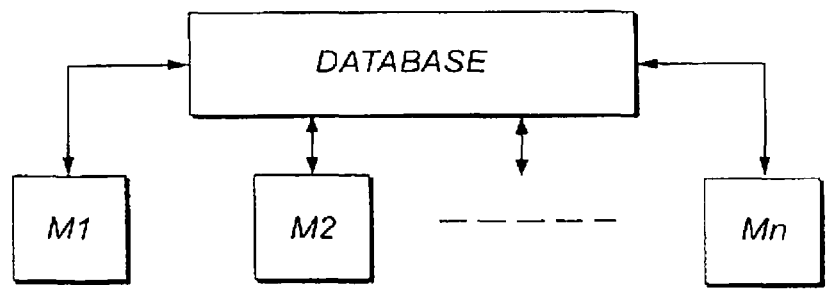
FIG. 4 is a schematic representation of a prior art network computing using clusters.

In the conventional arrangement in FIG. 3 utilising distributed software, memory access from one machine's software to memory physically located on another machine is permitted by the network interconnecting the machines. However, because the read and/or write memory access to memory physically located on another computer require the use of the slow network 14, in these configurations such memory accesses can result in substantial delays in memory read/write processing operation, potentially of the order of $10^6$-$10^7$ cycles of the central processing unit of the machine, but ultimately being dependant upon numerous factors, such as for example, the speed, bandwidth, and/or latency of the network 14. This in large part accounts for the diminished performance of the multiple interconnected machines in the prior art arrangement of FIG. 3.

However, in the present arrangement as described above in connection with FIG. 8, it will be appreciated that all reading of memory locations or data is satisfied locally because a current value of all (or some subset of all) memory locations is stored on the machine carrying out the processing which generates the demand to read memory.

Similarly, in the present arrangement as described above in connection with FIG. 8, it will be appreciated that all writing of memory locations or data may be satisfied locally because a current value of all (or some subset of all) memory locations is stored on the machine carrying out the processing which generates the demand to write to memory.

Such local memory read and write processing operation as performed according to the invention can typically be satisfied within $10^2$-$10^3$ cycles of the central processing unit. Thus, in practice, there is substantially less waiting for memory accesses which involves reads than the arrangement shown and described relative to FIG. 3. Additionally, in practice, there may be less waiting for memory accesses which involve writes than the arrangement shown and described relative to FIG. 3

It may be appreciated that most application software reads memory frequently but writes to memory relatively infrequently. As a consequence, the rate at which memory is being written or re-written is relatively slow compared to the rate at which memory is being read. Because of this slow demand for writing or re-writing of memory, the memory locations or fields can be continually updated at a relatively low speed via the possibly relatively slow and inexpensive commodity network 53, yet this possibly relatively slow speed is sufficient to meet the application program's demand for writing to memory. The result is that the performance of the FIG. 8 arrangement is superior to that of FIG. 3. It may be appreciated in light of the description provided herein that while a relatively slow network communication link or path 53 may advantageously be used because it provides the desired performance and low cost, the invention is not limited to a relatively low speed network connection and may be used with any communication link or path. The invention is transport, network, and communications path independent, and does not depend on how the communication between machines or DRTs takes place. In one embodiment, even electronic mail (email) exchanges between machines or DRTs may suffice for the communications.

In a further optional modification in relation to the above, the identity and changed value pair of a manipulated memory location sent over network 53, each pair typically sent as the sole contents of a single packet, frame or cell for example, can be grouped into batches of multiple pairs of identities and changed values corresponding to multiple manipulated memory locations, and sent together over network 53 or other communications link or path in a single packet, frame, or cell. This further modification further reduces the demands on the communication speed of the network 53 or other communications link or path interconnecting the various machines, as each packet, cell or frame may contain multiple identity and changed value pairs, and therefore fewer packets, frames, or cells require to be sent.

It may be apparent that in an environment where the application program code writes repeatedly to a single memory location, the embodiment illustrated of FIG. 11 of step 114 sends an updating and propagation message to all machines corresponding to every performed memory manipulation operation. In a still further optimal modification in relation to the above, the DRT thread 121/1 of FIG. 12 does not need to perform an updating and propagation operation corresponding to every local memory manipulation operation, but instead may send fewer updating and propagation messages than memory manipulation operations, each message containing the last or latest changed value or content of the manipulated memory location, or optionally may only send a single updating and propagation message corresponding to the last memory manipulation operation. This further improvement reduces the demands on the network 53 or other communications link or path, as fewer packets, frames, or cells require to be sent.

It will also be apparent to those skilled in the art in light of the detailed description provided herein that in a table or list or other data structure created by each DRT 71 when initially recording or creating the list of all, or some subset of all, memory locations (or fields), for each such recorded memory location on each machine M1, . . . , Mn there is a name or identity which is common or similar on each of the machines M1, . . . , Mn. However, in the individual machines the local memory location corresponding to a given name or identity (listed for example, during step 91 of FIG. 9) will or may vary over time since each machine may and generally will store changed memory values or contents at different memory locations according to its own internal processes. Thus the table, or list, or other data structure in each of the DRTs will have, in general, different local memory locations corresponding to a single memory name or identity, but each global "memory name" or identity will have the same "memory value" stored in the different local memory locations.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
(i) re-compilation at loading,
(ii) by a pre-compilation procedure prior to loading,
(iii) compilation prior to loading,
(iv) a "just-in-time" compilation, or
(v) re-compilation after loading (but, or for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language Given the fundamental concept of modifying memory manipulation operations to coordinate operation between and amongst a plurality of machines M1 ... Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3, ..., Mn (either sequentially or simultaneously or according to any other order, routine or procedure) with the modified object (or class or other asset or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is binary executable object code. Alternatively, the memory manipulation operation(s) that is (are) loaded is executable intermediary code.

Figure 15:
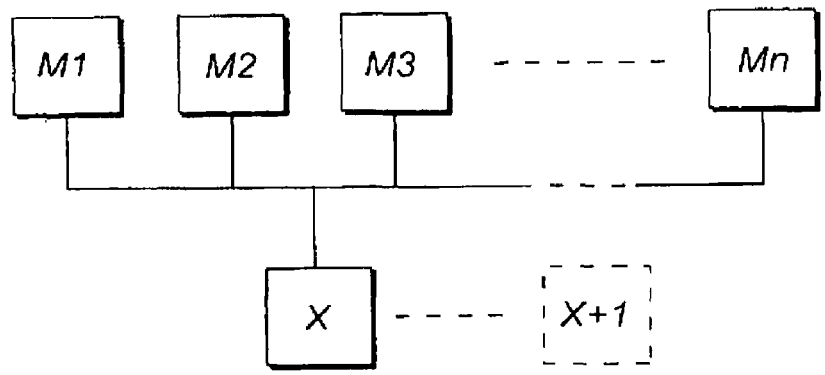
FIG. 15 is a schematic representation of n machines running the application program and serviced by an additional server machine X.

In this arrangement, which may be termed "master/slave" each of the slave (or secondary) machines M1, M3, ..., Mn loads the modified object (or class), and inclusive of the new modified memory manipulation operation(s), that was sent to it over the computer communications network or other communications link or path by the master (or primary) machine, such as machine M2, or some other machine such as a machine X of FIG. 15. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a still further embodiment, each machine M1, ..., Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different and to be enhanced, customized, and/or optimized based upon its particular machine architecture, hardware, processor, memory, configuration, operating system, or other factors, yet still similar, coherent and consistent with other machines with all other similar modifications and characteristics that may not need to be similar or identical.

In all of the described instances or embodiments, the supply or the communication of the asset code (such as class code or object code) to the machines M1, ..., Mn, and optionally inclusive of a machine X of FIG. 15, can be branched, distributed or communicated among and between the different machines in any combination or permutation; such as by providing direct machine to machine communication (for example, M2 supplies each of M1, M3, M4, etc. directly), or by providing or using cascaded or sequential communication (for example, M2 supplies M1 which then supplies M3 which then supplies M4, and so on), or a combination of the direct and cascaded and/or sequential.

Reference is made to the accompanying Annexure A in which: Annexure A5 is a typical code fragment from a memory manipulation operation prior to modification (e.g., an exemplary unmodified routine with a memory manipulation operation), and Annexure A6 is the same routine with a memory manipulation operation after modification (e.g., an exemplary modified routine with a memory manipulation operation). These code fragments are exemplary only and identify one software code means for performing the modification in an exemplary language. It will be appreciated that other software/firmware or computer program code may be used to accomplish the same or analogous function or operation without departing from the invention.

Annexures A5 and A6 (also reproduced in part in Table VI and Table VII below) are exemplary code listings that set forth the conventional or unmodified computer program software code (such as may be used in a single machine or computer environment) of a routine with a memory manipulation operation of application program code 50 and a post-modification excerpt of the same routine such as may be used in embodiments of the present invention having multiple machines. The modified code that is added to the routine is highlighted in bold text.

TABLE I

Summary Listing of Contents of Annexure A
Annexure A includes exemplary program listings in the JAVA language to further illustrate features, aspects, methods, and procedures of described in the detailed description A1. This first excerpt is part of an illustration of the modification code of the modifier 51 in accordance with steps 92 and 103 of FIG. 10. It searches through the code array of the application program code 50, and when it detects a memory manipulation instruction (i.e. a putstatic instruction (opcode 178) in the JAVA language and virtual machine environment) it modifies the application program code by the insertion of an "alert" routine.
A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.
A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1 . . . Mn.
A4. The fourth excerpt is part of the DRT 71, and corresponds to steps 135 and 136 of FIG. 13. This is a fragment of code to receive a propagated identity and value pair sent by another DRT 71 over the network, and write the changed value to the identified memory location.
A5. The fifth excerpt is an disassembled compiled form of the example.java application of Annexure A7, which performs a memory manipulation operation (putstatic and putfield).
A6. The sixth excerpt is the disassembled compiled form of the same example application in Annexure A5 after modification has been performed by FieldLoader.java of Annexure A11, in accordance with FIG. 9 of this invention. The modifications are highlighted in bold.
A7. The seventh excerpt is the source-code of the example.java application used in excerpt A5 and A6. This example application has two memory locations (staticValue and instanceValue) and performs two memory manipulation operations.
A8. The eighth excerpt is the source-code of FieldAlert.java which corresponds to step 125 and arrow 127 of FIG. 12, and which requests a thread 121/1 executing FieldSend.java of the "distributed run-time" 71 to propagate a changed value and identity pair to the other machines M1 . . . Mn.
A9. The ninth excerpt is the source-code of FieldSend.java which corresponds to step 128 of FIG. 12, and waits for a request/notification generated by FieldAlert.java of A8 corresponding to step 125 and arrow 127, and which propagates a changed value/identity pair requested of it by FieldAlert.java, via network 53.
A10. The tenth excerpt is the source-code of FieldReceive.java, which corresponds to steps 135 and 136 of FIG. 13, and which receives a propagated changed value and identity pair sent to it over the network 53 via FieldSend.java of annexure A9.
A11. FieldLoader.java. This excerpt is the source-code of FieldLoader.java, which modifies an application program code, such as the example.java application code of Annexure A7, as it is being loaded into a JAVA virtual machine in accordance with steps 90, 91, 92, 103, and 94 of FIG. 10. FieldLoader.java makes use of the convenience classes of Annexures A12 through to A36 during the modification of a compiled JAVA
A12. Attribute_info.java
Convience class for representing attribute_info structures within ClassFiles.
A13. ClassFile.java
Convience class for representing ClassFile structures.
A14. Code_attribute.java
Convience class for representing Code_attribute structures within ClassFiles.
A15. CONSTANT_Class_info.java
Convience class for representing CONSTANT_Class_info structures within ClassFiles.
A16. CONSTANT_Double_info.java
Convience class for representing CONSTANT_Double_info structures within ClassFiles.
A17. CONSTANT_Fieldref_info.java
Convience class for representing CONSTANT_Fieldref_info structures within ClassFiles.
A18. CONSTANT_Float_info.java
Convience class for representing CONSTANT_Float_info structures within ClassFiles.
A19. CONSTANT_Integer_info.java
Convience class for representing CONSTANT_Integer_info structures within ClassFiles.
A20. CONSTANT_InterfaceMethodref_info.java
Convience class for representing CONSTANT_InterfaceMethodref_info structures within ClassFiles.
A21. CONSTANT_Long_info.java
Convience class for representing CONSTANT_Long_info structures within ClassFiles.
A22. CONSTANT_Methodref_info.java
Convience class for representing CONSTANT_Methodref_info structures within ClassFiles.
A23. CONSTANT_NameAndType_info.java
Convience class for representing CONSTANT_NameAndType_info structures within ClassFiles.
A24. CONSTANT_String_info.java
Convience class for representing CONSTANT_String_info structures within ClassFiles.

TABLE I-continued

Summary Listing of Contents of Annexure A
Annexure A includes exemplary program listings in the JAVA language to further illustrate features, aspects, methods, and procedures of described in the detailed description A25. CONSTANT_Utf8_info.java
Convience class for representing CONSTANT_Utf8_info structures within ClassFiles.
A26. ConstantValue_attribute.java
Convience class for representing ConstantValue_attribute structures within ClassFiles.
A27. cp_info.java
Convience class for representing cp_info structures within ClassFiles.
A28. Deprecated_attribute.java
Convience class for representing Deprecated_attribute structures within ClassFiles.
A29. Exceptions_attribute.java
Convience class for representing Exceptions_attribute structures within ClassFiles.
A30. field_info.java
Convience class for representing field_info structures within ClassFiles.
A31. InnerClasses_attribute.java
Convience class for representing InnerClasses_attribute structures within ClassFiles.
A32. LineNumberTable_attribute.java
Convience class for representing LineNumberTable_attribute structures within ClassFiles.
A33. LocalVariableTable_attribute.java
Convience class for representing LocalVariableTable_attribute structures within ClassFiles.
A34. method_info.java
Convience class for representing method_info structures within ClassFiles.
A35. SourceFile_attribute.java
Convience class for representing SourceFile_attribute structures within ClassFiles.
A36. Synthetic_attribute.java
Convience class for representing Synthetic_attribute structures within ClassFiles.

TABLE II

Exemplary code listing showing embodiment of modified code.
A1. This first excerpt is part of an illustration of the modification of code of the modifier 51 in accordance with steps 92 and 103 of FIG. 10. It searches through the code array of the application program code 50, and when it detects a memory manipulation instruction (i.e. a putstatic instruction (opcode 178) in the JAVA language and virtual machine environment) it modifies the application program code by the insertion of an "alert" routine.

```
// START
byte[ ] code = Code_attribute.code;    // Bytecode of a given method in a
                                        // given classfile.
int code_length = Code_attribute.code_length;
int DRT = 99;  // Location of the CONSTANT_Methodref_info for the
               // DRT.alert( ) method.
for (int i=0; i<code_length; i++){
    if ((code[i] & 0xff) == 179){       // Putstatic instruction.
        System.arraycopy(code, i+3, code, i+6, code_length−(i+3));
        code[i+3] = (byte) 184;         // Invokestatic instruction for the
                                        // DRT.alert( ) method.
        code[i+4] = (byte) ((DRT >>> 8) & 0xff);
        code[i+5] = (byte) (DRT & 0xff);
    }
}
// END
```

TABLE III

Exemplary code listing showing embodiment of code for alert method
A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.

```
// START
public static void alert( ){
    synchronized (ALERT_LOCK){
        ALERT_LOCK.notify( ); // Alerts a waiting DRT thread in the
```

TABLE III-continued

Exemplary code listing showing embodiment of code for alert method
A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.

```
        background.
    }
}
// END
```

TABLE IV

Exemplary code listing showing embodiment of code for DRT
A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1 . . . Mn.

```
// START
MulticastSocket ms = DRT.getMulticastSocket( );   // The multicast socket
                                                   // used by the
                                                   // DRT for
                                                   // communication.
byte nameTag = 33;          // This is the "name tag" on the network for
                            // this field.
Field field = modifiedClass.getDeclaredField("myField1"); // Stores
                                                           // the field
                                                           // from the
                                                           // modified
                                                           // class.
// In this example, the field is a byte field.
while (DRT.isRunning( )){
    synchronized (ALERT_LOCK){
        ALERT_LOCK.wait( );  // The DRT thread is waiting for the alert
                             // method to be called.
```

TABLE IV-continued

Exemplary code listing showing embodiment of code for DRT
A3. This third excerpt is part of the DRT 71, and corresponds to
step 128 of FIG. 12. This code fragment shows the DRT in a separate
thread, such as thread 121/1 of FIG. 12, after being notified or
requested by step 125 and array 127, and sending the changed
value and changed value location/identity across the network 53 to
the other of the plurality of machines M1 . . . Mn.

```
        byte[ ] b = new byte[ ]{nameTag, field.getByte(null)};  // Stores
                                                                // the
                                                                // nameTag
                                                                // and the
                                                                // value
                                                                // of the
                                                                // field from
                                                                // the modified
                                                                // class in a
                                                                // buffer.
        DatagramPacket dp = new DatagramPacket(b, 0, b.length);
        ms.send(dp);       // Send the buffer out across the network.
    }
}
// END
```

TABLE V

Exemplary code listing showing embodiment of code for DRT receiving.
A4. The fourth excerpt is part of the DRT 71, and corresponds to steps
135 and 136 of FIG. 13. This is a fragment of code to receive a propagated
identity and value pair sent by another DRT 71 over the network, and
write the changed value to the identified memory location.

```
// START
MulticastSocket ms = DRT.getMulticastSocket( );  // The multicast socket
                                                 // used by the DRT for
                                                 // communication.
DatagramPacket dp = new DatagramPacket(new byte[2], 0, 2);
byte nameTag = 33;         // This is the "name tag" on the network for
                           // this field.
Field field = modifiedClass.getDeclaredField("myField1"); // Stores the
                                                          // field
                                                          // from the
                                                          // modified
                                                          // class.
// In this example, the field is a byte field.
while (DRT.isRunning){
    ms.receive(dp);        // Receive the previously sent buffer from the
    network.
    byte[ ] b = dp.getData( );
    if (b[0] == nameTag){  // Check the nametags match.
        field.setByte(null, b[1]);  // Write the value from the network packet
                                    // into the field location in
                                    // memory.
    }
}
// END
```

TABLE VI

Exemplary code listing showing embodiment of application
before modification is made.
A5. The fifth excerpt is an disassembled compiled form of the
example.java application of Annexure A7, which performs a
memory manipulation operation (putstatic and putfield).

```
Method void setValues(int, int)
   0 iload_1
   1 putstatic #3 <Field int staticValue>
   4 aload_0
   5 iload_2
   6 putfield #2 <Field int instanceValue>
   9 return
```

TABLE VII

Exemplary code listing showing embodiment of application after
modification is made.
A6. The sixth excerpt is the disassembled compiled form of the same
example application in Annexure A5 after modification has been
performed by FieldLoader.java of Annexure A11, in accordance with
FIG. 9 of this invention. The modifications are highlighted in bold.

```
Method void setValues(int, int)
   0 iload_1
   1 putstatic #3 <Field int staticValue>
   4 ldc #4 <String "example">
   6 iconst—0
   7 invokestatic #5 <Method void alert(java.lang.Object, int)>
   10 aload_0
   11 iload_2
   12 putfield #2 <Field int instanceValue>
   15 aload—0
   16 iconst—1
   17 invokestatic #5 <Method void alert(java.lang.Object, int)>
   20 return
```

TABLE VIII

Exemplary code listing showing embodiment of source-code of the
example application.
A7. The seventh excerpt is the source-code of the example.java
application used in excerpt A5 and A6. This example application
has two memory locations (staticValue and instanceValue) and
performs two memory manipulation operations.

```
import java.lang.*;
public class example{
    /** Shared static field. */
    public static int staticValue = 0;
    /** Shared instance field. */
    public int instanceValue = 0;
    /** Example method that writes to memory (instance field). */
    public void setValues(int a, int b){
        staticValue = a;
        instanceValue = b;
    }
}
```

TABLE IX

Exemplary code listing showing embodiment
of the source-code of FieldAlert.
A8. The eighth excerpt is the source-code of FieldAlert.java which
corresponds to step 125 and arrow 127 of FIG. 12, and which requests
a thread 121/1 executing FieldSend.java of the "distributed
run-time" 71 to propagate a changed value and identity pair to the other
machines M1 . . . Mn.

```
import java.lang.*;
import java.util.*;
import java.net.*;
import java.io.*;
public class FieldAlert{
    /** Table of alerts. */
    public final static Hashtable alerts = new Hashtable( );
    /** Object handle. */
    public Object reference = null;
    /** Table of field alerts for this object. */
    public boolean[ ] fieldAlerts = null;
    /** Constructor. */
    public FieldAlert(Object o, int initialFieldCount){
        reference = o;
        fieldAlerts = new boolean[initialFieldCount];
    }
    /** Called when an application modifies a value. (Both objects and
        classes) */
    public static void alert(Object o, int fieldID){
        // Lock the alerts table.
        synchronized (alerts){
```

TABLE IX-continued

Exemplary code listing showing embodiment
of the source-code of FieldAlert.
A8. The eighth excerpt is the source-code of FieldAlert.java which
corresponds to step 125 and arrow 127 of FIG. 12, and which requests
a thread 121/1 executing FieldSend.java of the "distributed
run-time" 71 to propagate a changed value and identity pair to the other
machines M1 . . . Mn.

```
        FieldAlert alert = (FieldAlert) alerts.get(o);
        if (alert == null){        // This object hasn't been alerted already,
                                   // so add to alerts table.
            alert = new FieldAlert(o, fieldID + 1);
            alerts.put(o, alert);
        }
        if (fieldID >= alert.fieldAlerts.length){
            // Ok, enlarge fieldAlerts array.
            boolean[ ] b = new boolean[fieldID+1];
            System.arraycopy(alert.fieldAlerts, 0, b, 0,
                alert.fieldAlerts.length);
            alert.fieldAlerts = b;
        }
        // Record the alert.
        alert.fieldAlerts[fieldID] = true;
        // Mark as pending.
        FieldSend.pending = true;   // Signal that there is one or more
                                    // propagations waiting.
        // Finally, notify the waiting FieldSend thread(s)
        if (FieldSend.waiting){
            FieldSend.waiting = false;
            alerts.notify( );
        }
      }
    }
}
```

It is noted that the compiled code in the annexure and portion repeated in the table is taken from the source-code of the file "example.java" which is included in the Annexure A7 (Table VIII). In the procedure of Annexure A5 and Table VI, the procedure name "Method void setValues(int, int)" of Step 001 is the name of the displayed disassembled output of the setValues method of the compiled application code of "example.java". The name "Method void setValues(int, int)" is arbitrary and selected for this example to indicate a typical JAVA method inclusive of a memory manipulation operation. Overall the method is responsible for writing two values to two different memory locations through the use of an memory manipulation assignment statement (being "putstatic" and "putfield" in this example) and the steps to accomplish this are described in turn.

First (Step 002), the Java Virtual Machine instruction "iload_1" causes the Java Virtual Machine to load the integer value in the local variable array at index 1 of the current method frame and store this item on the top of the stack of the current method frame and results in the integer value passed to this method as the first argument and stored in the local variable array at index 1 being pushed onto the stack.

The Java Virtual Machine instruction "putstatic #3 <Field int staticValue>" (Step 003) causes the Java Virtual Machine to pop the topmost value off the stack of the current method frame and store the value in the static field indicated by the CONSTANT_Fieldref_info constant-pool item stored in the $3^{rd}$ index of the classfile structure of the application program containing this example setValues( ) method and results in the topmost integer value of the stack of the current method frame being stored in the integer field named "staticValue".

The Java Virtual Machine instruction "aload_0" (Step 004) causes the Java Virtual Machine to load the item in the local variable array at index 0 of the current method frame and store this item on the top of the stack of the current method frame and results in the 'this' object reference stored in the local variable array at index 0 being pushed onto the stack.

First (Step 005), the Java Virtual Machine instruction "iload_2" causes the Java Virtual Machine to load the integer value in the local variable array at index 2 of the current method frame and store this item on the top of the stack of the current method frame and results in the integer value passed to this method as the first argument and stored in the local variable array at index 2 being pushed onto the stack.

The Java Virtual Machine instruction "putfield #2 <Field int instanceValue>" (Step 006) causes the Java Virtual Machine to pop the two topmost values off the stack of the current method frame and store the topmost value in the object instance field of the second popped value, indicated by the CONSTANT_Fieldref_info constant-pool item stored in the $2^{nd}$ index of the classfile structure of the application program containing this example setValues method and results in the integer value on the top of the stack of the current method frame being stored in the instance field named "instanceValue" of the object reference below the integer value on the stack.

Finally, the JAVA virtual machine instruction "return" (Step 007) causes the JAVA virtual machine to cease executing this setValues( ) method by returning control to the previous method frame and results in termination of execution of this setValues( ) method.

As a result of these steps operating on a single machine of the conventional configurations in FIG. 1 and FIG. 2, the JAVA virtual machine manipulates (i.e. writes to) the staticValue and instanceValue memory locations, and in executing the setValues( ) method containing the memory manipulation operation(s) is able to ensure that memory is and remains consistent between multiple threads of a single application instance, and therefore ensure that unwanted behaviour, such as for example inconsistent or incoherent memory between multiple threads of a single application instance (such inconsistent or incoherent memory being for example incorrect or different values or contents with respect to a single memory location) does not occur. Were these steps to be carried out on the plurality of machines of the configurations of FIG. 5 and FIG. 8 by concurrently executing the application program code 50 on each one of the plurality of machines M1 . . . Mn, the memory manipulation operations of each concurrently executing application program occurrence on each one of the machines would be performed without coordination between any other machine(s), such coordination being for example updating of corresponding memory locations on each machine such that they each report a same content or value. Given the goal of consistent, coordinated and coherent memory state and manipulation and updating operation across a plurality of a machines, this prior art arrangement would fail to perform such consistent, coherent, and coordinated memory state and manipulation and updating operation across the plurality of machines, as each machine performs memory manipulation only locally and without any attempt to coordinate or update their local memory state and manipulation operation with any other similar memory state on any one or more other machines. Such an arrangement would therefore be susceptible to inconsistent and incoherent memory state amongst machines M1 . . . Mn due to uncoordinated, inconsistent and/or incoherent memory manipulation and updating operation. Therefore it is the goal of the present invention to overcome this limitation of the prior art arrangement.

In the exemplary code in Table VII (Annexure A6), the code has been modified so that it solves the problem of consistent, coordinated memory manipulation and updating operation for a plurality of machines M1 ... Mn, that was not solved in the code example from Table VI (Annexure A5). In this modified setValues( ) method code, an "ldc #4 <String "example">" instruction is inserted after the "putstatic #3" instruction in order to be the first instruction following the execution of the "putstatic #3" instruction. This causes the JAVA virtual machine to load the String value "example" onto the stack of the current method frame and results in the String value of "example" loaded onto the top of the stack of the current method frame. This change is significant because it modifies the setValues( ) method to load a String identifier corresponding to the classname of the class containing the static field location written to by the "putstatic #3" instruction onto the stack.

Furthermore, the JAVA virtual machine instruction "iconst_0" is inserted after the "ldc #4" instruction so that the JAVA virtual machine loads an integer value of "0" onto the stack of the current method frame and results in the integer value of "0" loaded onto the top of the stack of the current method frame. This change is significant because it modifies the setValues( ) method to load an integer value, which in this example is "0", which represents the identity of the memory location (field) manipulated by the preceding "putstatic #3" operation. It is to be noted that the choice or particular form of the memory identifier used for the implementation of this invention is for illustration purposes only. In this example, the integer value of "0" is the identifier used of the manipulated memory location, and corresponds to the "staticValue" field as the first field of the "example.java" application, as shown in Annexure A7. Therefore, corresponding to the "putstatic #3" instruction, the "iconst_0" instruction loads the integer value "0" corresponding to the index of the manipulated field of the "putstatic #3" instruction, and which in this case is the first field of "example.java" hence the "0" integer index value, onto the stack.

Additionally, the JAVA virtual machine instruction "invokestatic #5 <Method boolean alert(java.lang.Object, int)>" is inserted after the "iconst_0" instruction so that the JAVA virtual machine pops the two topmost items off the stack of the current method frame (which in accordance with the preceding "ldc #4" instruction is a reference to the String object with the value "example" corresponding to the name of the class to which manipulated field belongs, and the integer "0" corresponding to the index of the manipulated field in the example.java application) and invokes the "alert" method, passing the two topmost items popped off the stack to the new method frame as its first two arguments. This change is significant because it modifies the setvalues( ) method to execute the "alert" method and associated operations, corresponding to the preceding memory manipulation operation (that is, the "putstatic #3" instruction) of the setvalues( ) method.

Likewise, in this modified setvalues( ) method code, an "aload_0" instruction is inserted after the "putfield #2" instruction in order to be the first instruction following the execution of the "putfield #2" instruction. This causes the JAVA virtual machine to load the instance object of the example class to which the manipulated field of the preceding "putfield #2" instruction belongs, onto the stack of the current method frame and results in the object reference corresponding to the instance field written to by the "putfield #2" instruction, loaded onto the top of the stack of the current method frame. This change is significant because it modifies the set-Values( ) method to load a reference to the object corresponding to the manipulated field onto the stack.

Furthermore, the JAVA virtual machine instruction "iconst_1" is inserted after the "aload_0" instruction so that the JAVA virtual machine loads an integer value of "1" onto the stack of the current method frame and results in the integer value of "1" loaded onto the top of the stack of the current method frame. This change is significant because it modifies the setValues( ) method to load an integer value, which in this example is "1", which represents the identity of the memory location (field) manipulated by the preceding "putfield #2" operation. It is to be noted that the choice or particular form of the identifier used for the implementation of this invention is for illustration purposes only. In this example, the integer value of "1" corresponds to the "instanceValue" field as the second field of the "example.java" application, as shown in Annexure A7. Therefore, corresponding to the "putfield #2" instruction, the "iconst_1" instruction loads the integer value "1" corresponding to the index of the manipulated field of the "putfield #2" instruction, and which in this case is the second field of "example.java" hence the "1" integer index value, onto the stack.

Additionally, the JAVA virtual machine instruction "invokestatic #5 <Method boolean alert(java.lang.Object, int)>" is inserted after the "iconst_1" instruction so that the JAVA virtual machine pops the two topmost item off the stack of the current method frame (which in accordance with the preceding "aload_0" instruction is a reference to the object corresponding to the object to which the manipulated instance field belongs, and the integer "1" corresponding to the index of the manipulated field in the example.java application) and invokes the "alert" method, passing the two topmost items popped off the stack to the new method frame as its first two arguments. This change is significant because it modifies the setValues( ) method to execute the "alert" method and associated operations, corresponding to the preceding memory manipulation operation (that is, the "putfield #2" instruction) of the setValues( ) method.

The method void alert(java.lang.Object, int), part of the FieldAlert code of Annexure A8 and part of the distributed runtime system (DRT) 71, requests or otherwise notifies a DRT thread 121/1 executing the FieldSend.java code of Annexure A9 to update and propagate the changed identity and value of the manipulated memory location to the plurality of machines M1 ... Mn.

It will be appreciated that the modified code permits, in a distributed computing environment having a plurality of computers or computing machines, the coordinated operation of memory manipulation operations so that the problems associated with the operation of the unmodified code or procedure on a plurality of machines M1 ... Mn (such as for example inconsistent and incoherent memory state and manipulation and updating operation) does not occur when applying the modified code or procedure.

Figure 14:
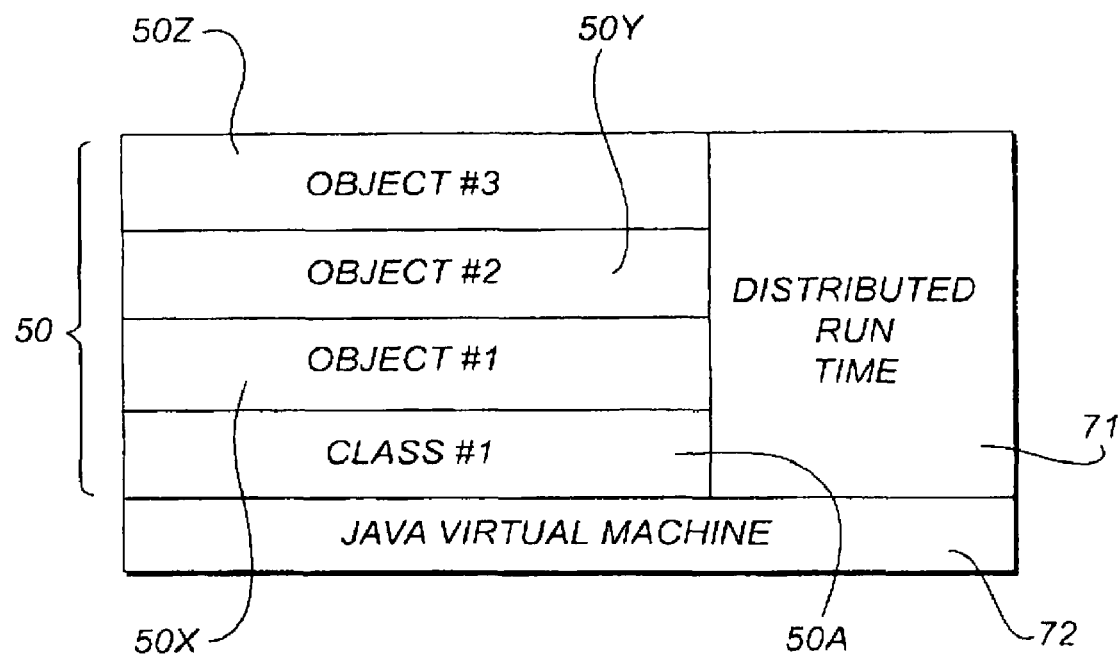
FIG. 14 is a schematic illustration of a prior art computer arranged to operate in JAVA code and thereby constitute a JAVA virtual machine.

Turning to FIG. 14, there is illustrated a schematic representation of a single prior art computer operated as a JAVA virtual machine. In this way, a machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that platform and/or runtime system may include virtual machine and non-virtual machine software and/or firmware architectures, as well as hardware and direct hardware coded applications and implementations.

Furthermore, the single machine (not a plurality of connected or coupled machines) of FIG. 14, or a more general virtual machine or abstract machine environment such as for example but not limited to an object-oriented virtual machine, is able to readily ensure that multiple different and potentially concurrent uses of specific objects 50X-50Z do not conflict or cause unwanted interactions, when specified by the use of mutual exclusion (e.g. "mutex") operators or operations (inclusive for example of locks, semaphores, monitors, barriers, and the like), such as for example by the programmer's use of a synchronizing or synchronization routine in a computer program written in the JAVA language. As each object exists singularly and only locally (that is locally within the machine within which execution is occurring) in this example, the single JAVA virtual machine 72 of FIG. 14 executing within this single machine is able to ensure that an object (or several objects) is (are) properly synchronized as defined by the JAVA Virtual Machine and Language Specifications existent at least as of the date of the filing of this patent application, when specified to do so by the application program (or programmer), and thus the object or objects to be synchronized are only utilized by one executing part of potentially multiple executing parts and potentially concurrently executing parts of the executable application code 50 at once or at the same time, such as for example potentially concurrently executing threads or processes. If another executing part and potentially concurrently executing part (such as for example but not limited to a potentially concurrently executing thread or process) of the executable application code 50 wishes to exclusively use the same object whilst that object is the subject of a mutual exclusion operation by a first executing part (e.g. a first thread or process), such as when a second executing part (e.g. a second thread or process) of a multiple part processing machine of FIG. 14 attempts to synchronize on a same object already synchronized by a first executing part, then the possible conflict is resolved by the JAVA virtual machine 72 such that the second and additional executing parts and potentially concurrently executing part or parts of the application program 50 have to wait until the first executing part has finished the execution of its synchronization routine or other mutual exclusion operation. It may be appreciated that in a conventional situation, a second or multiple executing part(s) (i.e. a second or multiple thread(s)) of the application program or program code may want to use the same object in a multiple-thread processing machine of FIG. 14.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, the terms 'class' and 'object' may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

A similar procedure applies mutatis mutandis (that is, with suitable or necessary alterations) for classes 50A. In particular, the computer programmer (or if and when applicable, an automated or nonautomated computer program generator or generation means) when writing or generating a program using the JAVA language and architecture in a single machine, need only use a synchronization routine or routines in order to provide for this avoidance of conflict or unwanted interaction. Thus a single JAVA virtual machine can keep track of exclusive utilization of the classes and objects (or other asset) and avoid corresponding problems (such as conflict, race condition, unwanted interaction, or other anomalous behaviour due to unexpected critical dependence on the relative timing of events) as necessary in an unobtrusive fashion. The process whereby only one object or class is exclusively used is termed "synchronization" in the JAVA language. In the JAVA language, synchronization may usually be operationalized or implemented in one of three ways or means. The first way or means is through the use of a synchronization method description that is included in the source-code of an application program written in the JAVA language. The second way or means is by the inclusion of a 'synchronization descriptor' in the method descriptor of a compiled application program of the JAVA virtual machine. And the third way or means for performing synchronization are by the use of the instructions monitor enter (e.g., "monitorenter") and monitor exit (e.g., "monitorexit") of the JAVA virtual machine which signify respectively the beginning and ending of a synchronization routine which results in the acquiring or execution of a "lock" (or other mutual exclusion operator or operation), and the releasing or termination of a "lock" (or other mutual exclusion operator or operation) respectively which prevents an asset being the subject of conflict (or race condition, or unwanted interaction, or other anomalous behaviour due to unexpected critical dependence on the relative timing of events) between multiple and potentially concurrent uses. An asset may for example include a class or an object, as well as any other software/language/runtime/platform/architecture or machine resource. Such resources may include for example, but are not limited to, software programs (such as for example executable software, modules, subprograms, sub-modules, application program interfaces (API), software libraries, dynamically linkable libraries) and data (such as for example data types, data structures, variables, arrays, lists, structures, unions), and memory locations (such as for example named memory locations, memory ranges, address space(s), registers,) and input/output (I/O) ports and/or interfaces, or other machine, computer, or information appliance resource or asset.

Figure 21:
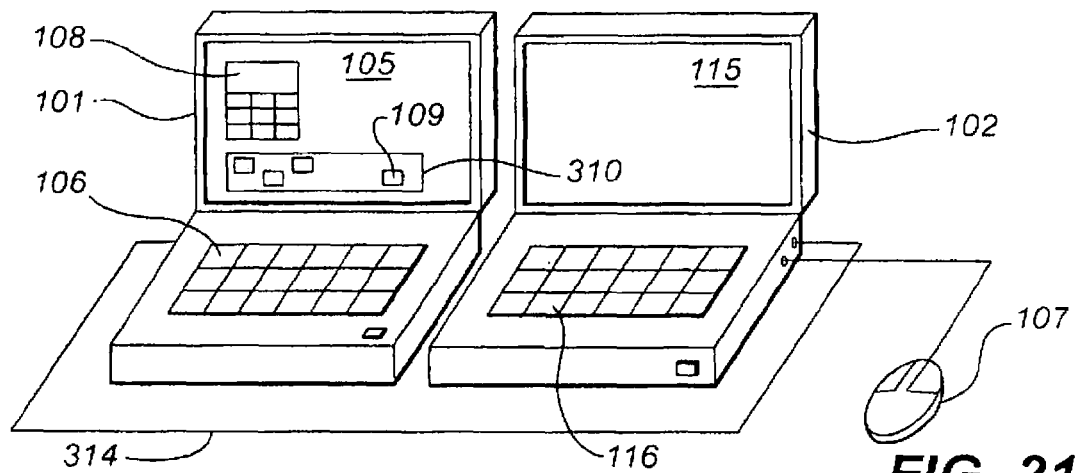
FIG. 21 is a schematic representation of two laptop computers interconnected to simultaneously run a plurality of applications, with both applications running on a single computer.

However, in the arrangement illustrated in FIG. 8, (and also in FIGS. 21-23), a plurality of individual computers or machines M1, M2, . . . , Mn are provided, each of which are interconnected via a communications network 53 or other communications link and each of which individual computers or machines is provided with a modifier 51 (See in FIG. 5) and realised by or in for example the distributed run time (DRT) 71 (See FIG. 8) and loaded with a common application code 50. The term common application program is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50, and this single copy or perhaps a plurality of identical copies are modified to generate a modified copy or version of the application program, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

Essentially the modifier 51 or DRT 71 ensures that when an executing part (such as a thread or process) of the modified application program 50 running on one or more of the machines exclusively utilizes (e.g., by means of a synchronization routine or similar or equivalent mutual exclusion operator or operation) a particular local asset, such as an objects 50X-50Z or class 50A, no other executing part and potentially concurrently executing part on machines M2 . . . Mn exclusively utilizes the similar equivalent corresponding asset in its local memory at once or at the same time.

It will be appreciated in light of the description provided herein that there are alternative implementations of the modifier 51 and the distributed runtime system 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

It will therefore be understood in light of the description provided here that the invention further includes any means of implementing thread-safety, regardless of whether it is through the use of locks (lock/unlock), synchronizations, monitors, semphafores, mutexes, or other mechanisms.

It will be appreciated that synchronization means or implies "exclusive use" or "mutual exclusion" of an asset or resource. Conventional structures and methods for implementations of single computers or machines have developed some methods for synchronization on such single computer or machine configurations. However, these conventional structures and methods have not provided solutions for synchronization between and among a plurality of computers, machines, or information appliances.

In particular, whilst one particular machine (say, for example machine M3) is exclusively using an object or class (or any other asset or resource), another machine (say, for example machine M5) may also be instructed by the code it is executing to exclusively use the local similar equivalent object or class corresponding to the similar equivalent object or class on machine M3 at the same time or an overlapping time period. Thus if the same corresponding local similar equivalent objects or classes on each machine M3 and M5 were to be exclusively used by both machines, then the behaviour of the object and application as a whole is undefined— that is, in the absence of proper exclusive use of an object (or class) when explicitly specified by the computer program (programmer), conflict, race conditions, unwanted interactions, anomalous behaviour due to unexpected dependence on the relative timing of events, or permanent inconsistency between the similar equivalent objects on machines M5 and M3 is likely to result. Thus a goal of achieving or providing consistent, coordinated, and coherent operation of synchronization routines (or other mutual exclusion operations) between and amongst a plurality of machines, as required for the simultaneous and coordinated operation of the same application program code on each of the plurality of machines M1, M2 . . . Mn, would not be achieved.

In order to ensure consistent synchronization between and amongst machines M1, M2 . . . Mn the application code 50 is analysed or scrutinized by searching through the executable application code 50 in order to detect program steps (such as particular instructions or instruction types) in the application code 50 which define or constitute or otherwise represent a synchronization routine (or other mutual exclusion operation). In the JAVA language, such program steps may for example comprise or consist of an opening monitor enter (e.g. "monitorenter") instruction and one or more closing monitor exit (e.g. "monitorexit") instructions. In one embodiment, a synchronization routine may start with the execution of a "monitorenter" instruction and close with a paired execution of a "monitorexit" instruction.

This analysis or scrutiny of the application code 50 may take place either prior to loading the application program code 50, or during the application program code 50 loading procedure, or even after the application program code 50 loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.Class-Loader loadClass method (e.g., "java.lang.ClassLoader.load-Class( )").

Alternatively, the analysis or scrutiny of the application code 50 may take place even after the application program code loading procedure, such as after the operating system has loaded the application code into memory, or optionally even after execution of the application program code has started, such as for example after the JAVA virtual machine has loaded the application code into the virtual machine via the "java.lang.ClassLoader.loadClass( )" method and optionally commenced execution.

Reference is made to the accompanying Annexure D in which: Annexure D1 is a typical code fragment from a synchronization routine prior to modification (e.g., an exemplary unmodified synchronization routine), and Annexure D2 is the same synchronization routine after modification (e.g., an exemplary modified synchronization routine). These code fragments are exemplary only and identify one software code means for performing the modification in an exemplary language. It will be appreciated that other software/firmware or computer program code may be used to accomplish the same or analogous function or operation without departing from the invention.

Annexures D1 and D2 (also reproduced in part in Tables XX and XXI below) are exemplary code listings that set forth the conventional or unmodified computer program software code (such as may be used in a single machine or computer environment) of a synchronization routine of application program 50 and a post-modification excerpt of the same synchronization routine such as may be used in embodiments of the present invention having multiple machines. The modified code that is added to the synchronization method is highlighted in bold text. Other embodiments of the invention may provide for code or statements or instructions to be added, amended, removed, moved or reorganized, or otherwise altered.

It is noted that the compiled code in the Annexure and portion repeated in the table is taken from the source-code of the file "example.java" which is included in the Annexure D3. The disassembled compiled code that is listed in the Annexure and Table is taken from compiled source code of the file "EXAMPLE.JAVA". In the procedure of Annexure D1 and Table X, the procedure name "Method void run( )" of Step 001 is the name of the displayed disassembled output of the run method of the compiled application code of "example.java". The name "Method void run( )" is arbitrary and selected for this example to indicate a typical JAVA method inclusive of a synchronization operation. Overall the method is responsible for incrementing a memory location ("counter") in a thread-safe manner through the use of a synchronization statement and the steps to accomplish this are described in turn.

First (Step 002), the Java Virtual Machine instruction "getstatic #2 <Field java.lang.Object LOCK>" causes the Java Virtual Machine to retrieve the object reference of the static field indicated by the CONSTANT_Fieldref_info constant-pool item stored in the $2^{nd}$ index of the classfile structure of the application program containing this example run( ) method and results in a reference to the object (hereafter referred to as LOCK) in the field to be placed (pushed) on the stack of the current method frame of the currently executing thread.

Next (Step 003), the Java Virtual Machine instruction "dup" causes the Java Virtual Machine to duplicate the topmost item of the stack and push the duplicated item onto the topmost position of the stack of the current method frame and results in the reference to the LOCK object at the top of the stack being duplicated and pushed onto the stack.

Next (Step 004), the Java Virtual Machine instruction "astore_1" causes the Java Virtual Machine to remove the topmost item of the stack of the current method frame and store the item into the local variable array at index 1 of the current method frame and results in the topmost LOCK object reference of the stack being stored in the local variable index 1.

Then (Step 005), the Java Virtual Machine instruction "monitorenter" causes the Java Virtual Machine to pop the topmost object off the stack of the current method frame and acquire an exclusive lock on said popped object and results in a lock being acquired on the LOCK object.

The Java Virtual Machine instruction "getstatic #3 <Field int counter>" (Step 006) causes the Java Virtual Machine to retrieve the integer value of the static field indicated by the CONSTANT_Fieldref_info constant-pool item stored in the 3rd index of the classfile structure of the application program containing this example run( ) method and results in the integer value of said field being placed (pushed) on the stack of the current method frame of the currently executing thread.

The Java Virtual Machine instruction "iconst_1" (Step 007) causes the Java Virtual Machine to load an integer value of "1" onto the stack of the current method frame and results in the integer value of 1 loaded onto the top of the stack of the current method frame.

The Java Virtual Machine instruction "iadd" (Step 008) causes the Java Virtual Machine to perform an integer addition of the two topmost integer values of the stack of the current method frame and results in the resulting integer value of the addition operation being placed on the top of the stack of the current method frame.

The Java Virtual Machine instruction "putstatic #3 <Field int counter>" (Step 009) causes the Java Virtual Machine to pop the topmost value off the stack of the current method frame and store the value in the static field indicated by the CONSTANT_Fieldref_info constant-pool item stored in the $3^{rd}$ index of the classfile structure of the application program containing this example run( ) method and results in the topmost integer value of the stack of the current method frame being stored in the integer field named "counter".

The Java Virtual Machine instruction "aload_1" (Step 010) causes the Java Virtual Machine to load the item in the local variable array at index 1 of the current method frame and store this item on the top of the stack of the current method frame and results in the object reference stored in the local variable array at index 1 being pushed onto the stack.

The Java Virtual Machine instruction "monitorexit" (Step 011) causes the Java Virtual Machine to pop the topmost object off the stack of the current method frame and release the exclusive lock on said popped object and results in the LOCK being released on the LOCK object.

Finally, the Java Virtual Machine instruction "return" (Step 012) causes the Java Virtual Machine to cease executing this run( ) method by returning control to the previous method frame and results in termination of execution of this run( ) method.

As a result of these steps operating on a single machine of the conventional configurations in FIG. 1 and FIG. 2, the synchronization statement enclosing the increment operation of the "counter" memory location ensures that no two or more concurrently execution instances of this run( ) method will conflict, or otherwise result in unwanted interactions such as a race-condition or other anomalous behaviour due to unexpected critical dependence on the relative timing of the incrementing events performed of the one "counter" memory location. Were these steps to be carried out on the plurality of machines of the configurations of FIG. 5 and FIG. 8 with the memory update and propagation replication means of FIGS. 9, 10, 11, 12 and 13, and concurrently executing two or more instances or occurrences of the run( ) method each on a different one of the plurality of machines M1, M2 . . . Mn, the mutual exclusion operations of each concurrently executing instance of the run( ) method would be performed on each corresponding one of the machines without coordination between those machines.

Given the goal of consistent coordinated synchronization operation across a plurality of machines, this prior art arrangement would fail to perform such consistent coordinated synchronization operation across the plurality of machines, as each machine performs synchronization only locally and without any attempt to coordinate their local synchronization operation with any other similar synchronization operation on any one or more other machines. Such an arrangement would therefore be susceptible to conflict or other unwanted interactions (such as race-conditions or other anomalous behaviour due to unexpected critical dependence on the relative timing of the "counter" increment events on each machine) between the machines M1, M2, . . . , Mn. Therefore it is the goal of the present invention to overcome this limitation of the prior art arrangement.

In the exemplary code in Table XI (Annexure D2), the code has been modified so that it solves the problem of consistent coordinated synchronization operation for a plurality of machines M1, M2, . . . , Mn, that was not solved in the code example from Table X (Annexure D1). In this modified run( ) method code, a "dup" instruction is inserted between the "4 astore_1" and "6 monitorenter" instructions. This causes the Java Virtual Machine to duplicate the topmost item of the stack and push said duplicated item onto the topmost position of the stack of the current method frame and results in the reference to the LOCK object at the top of the stack being duplicated and pushed onto the stack.

Furthermore, the Java Virtual Machine instruction "invokestatic #23 <Method void acquireLock(java.lang.Object)>" is inserted after the "6 monitorenter" and before the "10 getstatic #3 <Field int counter>" statements so that the Java Virtual Machine pops the topmost item off the stack of the current method frame and invokes the "acquireLock" method, passing the popped item to the new method frame as its first argument. This change is particularly significant because it modifies the run( ) method to execute the "acquireLock" method and associated operations, corresponding to the "monitorenter" instruction preceding it. Annexure D1 is a before-modification excerpt of the disassembled compiled form of the synchronization operation of example.java of Annexure D3, consisting of an starting "monitorenter" instruction and ending "monitorexit" instruction. Annexure D2 is an after-modification form of Annexure D1, modified by LockLoader.java of Annexure D6 in accordance with the steps of FIG. 16. The modifications are highlighted in bold.

TABLE X

Annexure D1

| Step | Annexure D1 |
| --- | --- |
| 001 | Method void run( ) |
| 002 | 0 getstatic #2 <Field java.lang.Object LOCK> |
| 003 | 3 dup |
| 004 | 4 astore_1 |
| 005 | 5 monitorenter |
| 006 | 6 getstatic #3 <Field int counter> |
| 007 | 9 iconst_1 |
| 008 | 10 iadd |
| 009 | 11 putstatic #3 <Field int counter> |
| 010 | 14 aload_1 |
| 011 | 15 monitorexit |
| 012 | 16 return |

TABLE XI

Annexure D2

| Step | Annexure D2 |
| --- | --- |
| 001 | Method void run( ) |
| 002 | 0 getstatic #2 <Field java.lang.Object LOCK> |
| 003 | 3 dup |
| 004 | 4 astore_1 |
| 004A | 5 dup |
| 005 | 6 monitorenter |
| 005A | 7 invokestatic #23 <Method void acquireLock(java.lang.Object)> |
| 006 | 10 getstatic #3 <Field int counter> |
| 007 | 13 iconst_1 |
| 007 | 14 iadd |
| 008 | 15 putstatic #3 <Field int counter> |
| 009 | 18 aload_1 |
| 010 | 19 dup |
| 010A | 20 invokestatic #24 <Method void releaseLock(java.lang.Object)> |
| 010B | 23 monitorexit |
| 011 | 24 return |

Figure 19:
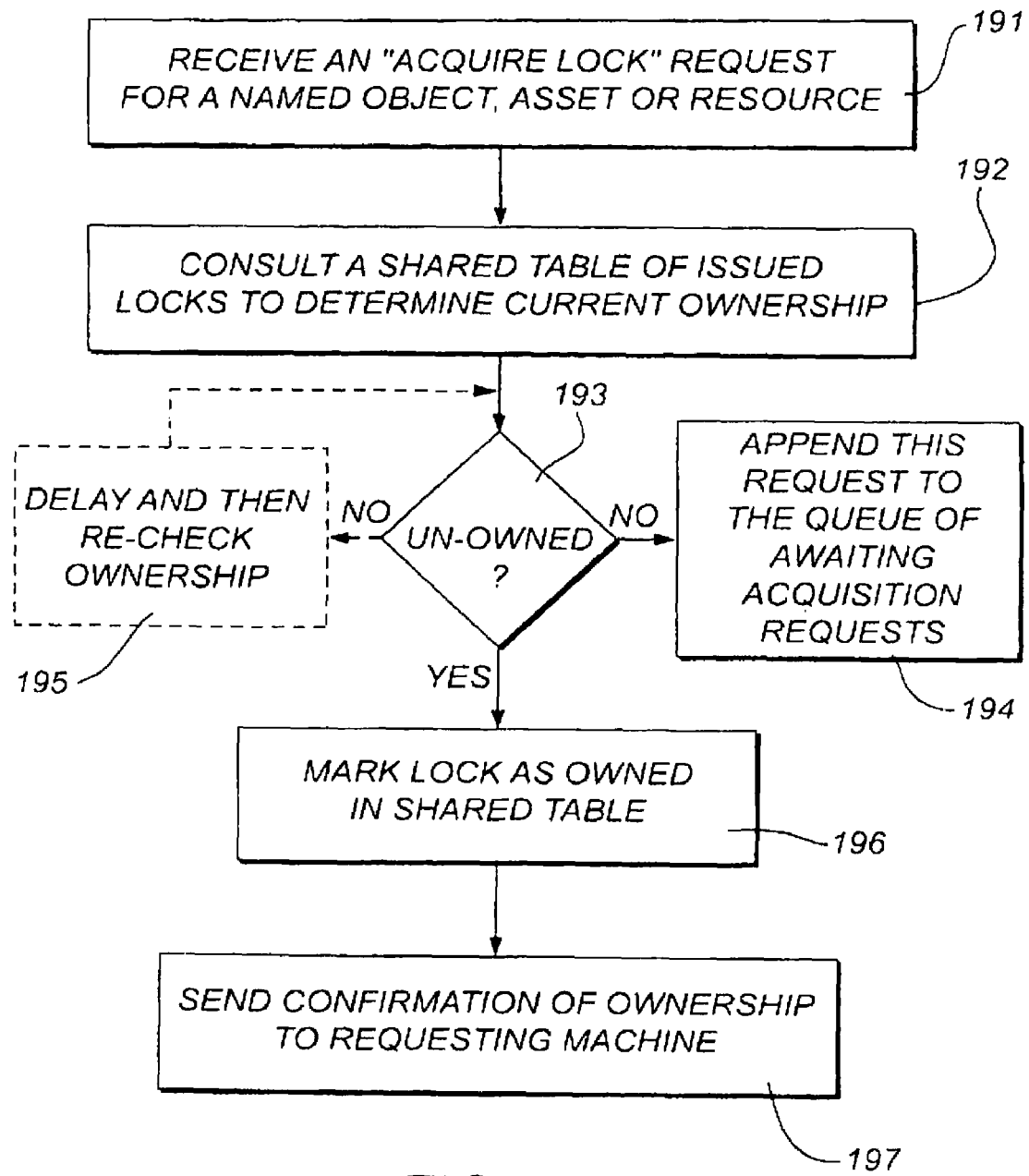
FIG. 19 is a flow chart of the response of the server machine X to the request of FIG. 17.

The method void acquireLock(java.lang.Object), part of the LockClient code of Annexure D4 and part of the distributed runtime system (DRT) 71, performs the communications operations between machines M1, . . . , Mn to coordinate the execution of the preceding "monitorenter" synchronization operation amongst the machines M1 . . . Mn. The acquireLock method of this example communicates with the LockServer code of Annexure D5 executing on a machine X of FIG. 15, by means of sending an 'acquire lock request' to machine X corresponding to the object being 'locked' (i.e., the object corresponding to the "monitorenter" instruction), which in the context of Table XI and Annexure D2 is the 'LOCK' object. With reference to FIG. 19, Machine X receives the 'acquire lock request' corresponding to the LOCK object, and consults a table of locks to determine the lock status corresponding to the plurality of similar equivalent objects on each of the machines, which in the case of Annexure D2 is the plurality of similar equivalent LOCK objects.

If all of the plurality of similar equivalent objects on each of the plurality of machines M1 . . . Mn is presently not locked by any other machine M1 . . . Mn, then Machine X will record the object as now locked and inform the requesting machine of the successful acquisition of the lock. Alternatively, if a similar equivalent object is presently locked by another one of the machines M1 . . . Mn, then Machine X will append this requesting machine to a queue of machines waiting to lock this plurality of similar equivalent objects, until such a time as machine X determines this requesting machine can acquire the lock. Corresponding to the successful acquisition of a lock by a requesting machine, a reply is generated and sent to the successful requesting machine informing that machine of the successful acquisition of the lock. Following a receipt of such a message from Machine X confirming the successful acquisition of a requested lock, the acquireLock method and operations terminate execution and return control to the previous method frame, which is the context of Annexure D2 is the executing method frame of the run( ) method. Until such a time as the requesting machine receives a reply from machine X confirming the successful acquisition of the requested lock, the operation of the acquireLock method and run( ) method are suspended until such a confirmatory reply is received. Following this return operation, the execution of the run( ) method then resumes. Exemplary source-code for an embodiment of the acquireLock method is provided in Annexure D4. Annexure D4 also provides additional detail concerning DRT 71 functionality.

Later, the two statements "dup" and "invokestatic #24 <Method void releaseLock(java.lang.Object)>" are inserted into the code stream after the "18 aload_1" statement and before the "23 monitorexit" statement. These two statements cause the Java Virtual Machine to duplicate the item on the stack and then invoke the releaseLock method with the topmost item of the stack as an argument to the method call and result in the modification of the run( ) method to execute the "releaseLock" method and associated operations, corresponding to the following "monitorexit" instruction, before the procedure exits and returns.

Figure 20:
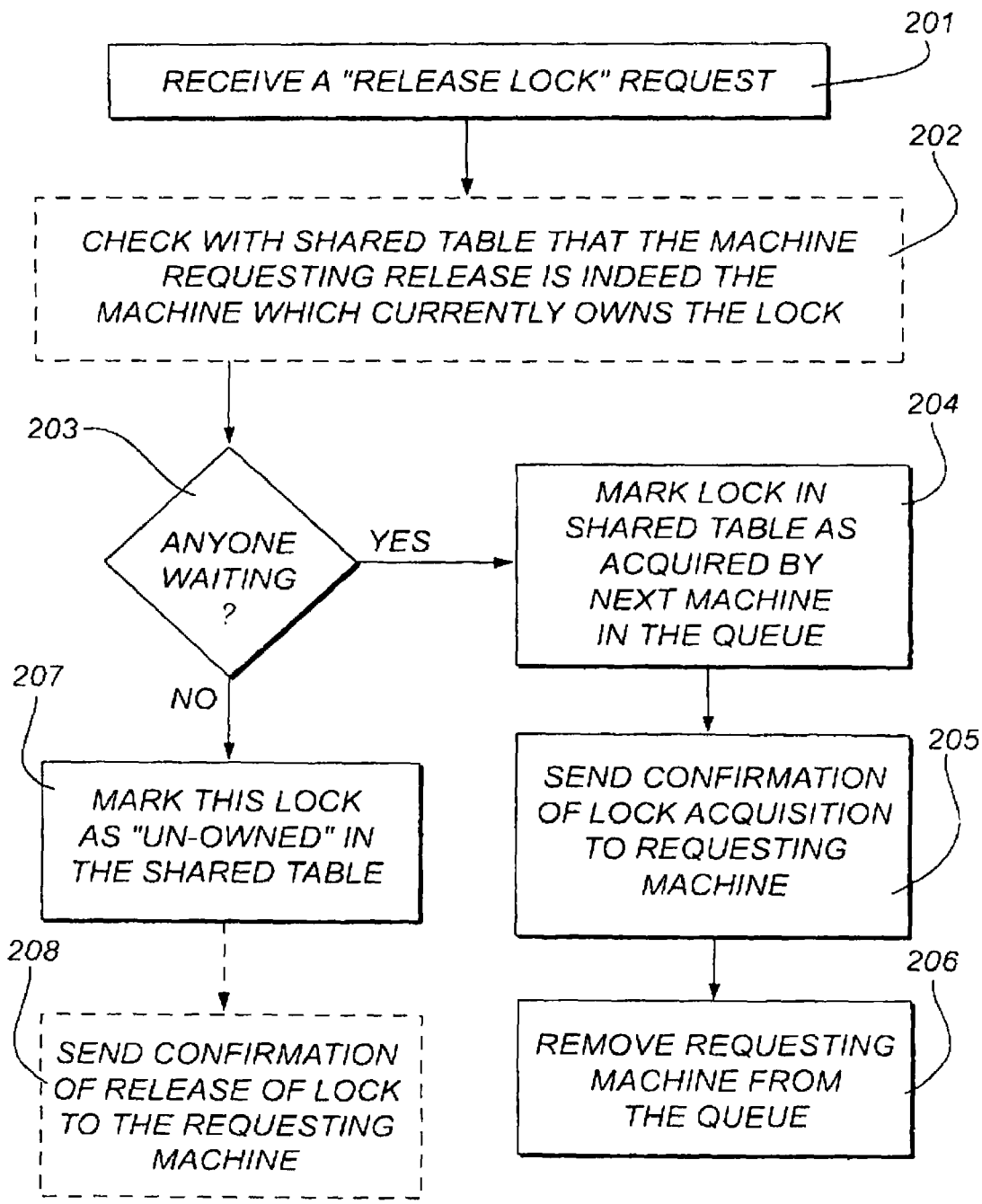
FIG. 20 is a flow chart illustrating the response of the server machine X to the request of FIG. 18.

The method void releaseLock(java.lang.Object), part of the LockClient code of Annexure D4 and part of the distributed runtime system (DRT) 71, performs the communications operations between machines M1 . . . Mn to coordinate the execution of the following "monitorexit" synchronization operation amongst the machines M1 . . . Mn. The releaseLock method of this example communications with LockServer code of Annexure D5 executing on a machine X of FIG. 15, by means of sending a "release lock request" to machine X corresponding to the object being "unlocked" (i.e., the object corresponding to the "monitorexit" instruction), which in the context of Table XI and Annexure D2 is the 'LOCK' object. Corresponding to FIG. 20, machine X receives the "release lock request" corresponding to the LOCK object, and updates the table of locks to indicate the lock status corresponding to the plurality of similar equivalent 'LOCK' objects as now "unlocked". Additionally, if there are other machines awaiting acquisition of this lock, then machine X is able to select one of the awaiting machines to be the new owner of the lock by updating the table of locks to indicate this selected one awaiting machine as the new lock owner, and informing the successful one of the awaiting machines of its successful acquisition of the lock by means of a confirmatory reply. The successful one of the awaiting machines then resumes execution of its synchronization routine. Following the notification to machine X of lock release, the releaseLock method terminates execution and returns control to the previous method frame, which in this instance is the method frame of the run( ) method. Following this return operation, the execution of the run( ) method resumes.

It will be appreciated that the modified code permits, in a distributed computing environment having a plurality of computers or computing machines, the coordinated operation of synchronization routines or other mutual exclusion operations between and amongst machines M1 . . . Mn so that the problems associated with the operation of the unmodified code or procedure on a plurality of machines M1 . . . Mn (such as conflicts, unwanted interactions, race-conditions, or anomalous behaviour due to unexpected critical dependence on the relative time of events) does not occur when applying the modified code or procedure.

In the unmodified code sample of Annexure D1, the application program code includes instructions or operations that increment a memory location in local memory (used for a counter) within an enclosing synchronization routine. The purpose of the synchronization routine is to ensure thread-safety of the counter memory increment operation in multi-threaded and multi-processing applications and computer systems. The terms thread-safe or thread-safety refer to code that is either re-entrant or protected from multiple simultaneous execution by some form of mutual exclusion. Multi-threaded applications in the context of the invention may, for example, include applications operating two or more threads of execution concurrently each on a different machine. Thus, without the management of coordinated synchronization in environments comprising or consisting of a plurality of machines, each running concurrently executing part of a same application program, and with a memory updating and propagation replication means of FIGS. 9, 10, 11, 12, and 13, each computer or computing machine would perform synchronization in isolation, thus potentially incrementing the shared counter at the same time, leading to potential conflicts or unwanted interactions such as race condition(s) and incoherent memory between the machines M1 . . . Mn. It will be appreciated that although this embodiment is described using a shared counter, the use or provision of such shared counter or memory location is optional and not required for the synchronization aspects of the invention. What is advantageous is that the synchronization routine behaves in a manner as the programming language, runtime system, or machine architecture (or any combination thereof) guarantees—that is, stop two parts (for example, two threads) of the application program from executing the same synchronization routine or same mutual exclusion operation or operator concurrently. Clearly consistent, coherent and coordinated synchronization behaviour is what the programmer or user of the application program code 50 expects to happen.

So, taking advantage of the DRT 71, the application code 50 is modified as it is loaded into the machine by changing the synchronization routine. It will be appreciated in light of the description provided here that the modifications made on each machine may generally be similar in-so-far as they should advantageously achieve a consistent end result of coordinated synchronization operation amongst all the machines; however, given the broad applicability of the inventive synchronization method and associated procedures, the nature of the modifications may generally vary without altering the effect produced. For example, in a simple variation, one or more additional instructions or statements may be inserted, such as for example a "no-operation" (nop) type instruction into the application will mean the modifications made are technically different, but the modified code still conforms to the invention. Embodiments of the invention may for example, implement the changes by means of program transformation, translation, various forms of compilation, instrumentation, or by other means described herein or known in the art. The changes made (highlighted in bold text) are the starting or initial instructions and the ending instructions that the synchronization routine executes, and which correspond to the entry (start) and exit (finish) of the synchronization routine respectively. These added instructions (or modified instruction stream) act to coordinate the execution of the synchronization routine amongst the multiple concurrently executing instances or occurrences of the modified run method executing on each one of, or some subset of, the plurality of machines M1 . . . Mn, by invoking the acquireLock method corresponding to the start of execution of the synchronization routine, and by invoking the releaseLock method corresponding to the finish of execution of the synchronization routine, thereby providing consistent coordinated operation of the synchronization routine (or other mutual exclusion operation or operator) as required for the simultaneous operation of the modified application program code that is running on or across the plurality of machines M1, M2, . . . , Mn. This also advantageously provides for operation of the one application program in a coordinated manner across the machines.

The acquire lock (e.g. "acquireLock( )") method of the DRT 71 takes an argument "(java.lang.Object)" which represents a reference to (or some other unique identifier for) the particular local object for which the global lock is desired (See Annexure D2 and Table XI), and is to be used in acquiring a global lock across the plurality of similar equivalent objects on the other machines corresponding to the specified local object. The unique identifier may, for example be the name of the object, a reference to the object in question, or a unique number representing the plurality of similar equivalent objects across all nodes. By using a globally unique identifier across all connected machines to represent the plurality of similar equivalent objects on the plurality of machines, the DRT can support the synchronization of multiple objects at the same time without becoming confused as to which of the multiple objects are already synchronized and which are not as might be the case if object (or class) identifiers were not unique, by using the unique identifier of each object to consult the correct record in the shared synchronization table.

A further advantage of using a global identifier here is as a form of 'meta-name' for all the similar equivalent local objects on each one of the machines. For example, rather than having to keep track of each unique local name of each similar equivalent local object on each machine, one may instead define a global name (e.g., "globalname7787") which each local machine in turn maps to a local object (e.g., "globalname7787" points to object "localobject456" on machine M1, and "globalname7787" points to object "localobject885" on machine M2, and "globalname7787" points to object "localobject111" on machine M3, and so forth). It thereafter is easier to simply say "acquire lock for globalname7787" which is then translated on machine 1 (M1) to mean "acquire lock for localobject456", and is translated on machine 2 (M2) to mean "acquire lock for localobject885", and so on.

The shared synchronization table that may optionally be used is a table, other storage means, or any other data structure that stores an object (and/or class or other asset) identifier and the synchronization status (or locked or unlocked status) of each object (and/or class or other asset). The table or other storage means operates to relate an object (and/or class or other asset, or a plurality of similar equivalent objects or classes or assets) to a status of either locked or unlocked or some other physical or logical indication of a locked state and an unlocked state. For example: the table (or any other data structure one cares to employ) may advantageously include a named object identifier and a record indicating if a named object (i.e., "globalname7787") is locked or unlocked. In one embodiment, the table or other storage means stores a flag or memory bit, wherein when the flag or memory bit stores a "0" the object is unlocked and when the flag or memory bit stores a "1" the object is locked. Clearly, multiple bit or byte storage may be used and different logic sense or indicators may be used without departing from the invention.

The DRT 71 can determine the synchronization state of the object in any one of a number of ways. Recall, for example that the invention may include any means of implementing thread-safety, regardless of whether it is through the use of locks (lock/unlock), synchronizations, monitors, semphafores, mutexes, or other mechanisms. These means stop or limit concurrently executing parts of a single application program in order to guarantee consistency according to the rules of synchronization, locks, or the like. Preferably, it can ask each machine in turn if their local similar equivalent object (or class or other asset or resource) corresponding to the object being sought to be locked is presently synchronized, and if any machine replies true, then to pause execution of the synchronization routine and wait until that presently synchronized similar equivalent object on the other machine is unsynchronised, otherwise synchronize this object locally and resume execution of the synchronization routine. Each machine may implement synchronization (or mutual exclusion operations or operators) in its own way and this may be different in the different machines. Therefore, although some exemplary implementation details are provided, ultimately how synchronization (or mutual exclusion operations) is (are) implemented, or precisely how synchronization or mutual exclusion status (or locked/unlocked status) is recorded in memory or other storage means, is not critical to the invention. By unsynchronized we generally mean unlocked or otherwise not subject to a mutual exclusion operation, and by synchronized we generally mean locked and subject to a mutual exclusion operation.

Alternatively, the DRT 71 on each local machine can consult a shared record table (perhaps on a separate machine (for example, on machine X which is different from machines M1, M2, . . . , Mn)), or can consult a coherent shared record table on each one of the local machines, or a shared database established in a memory or other storage, to determine if this object has been marked or identified as synchronized (or "locked") by any machine and if so, then wait until the status of the object is changed to "unlocked" and then acquire the lock on this machine, otherwise acquire the lock by marking the object as locked (optionally by this machine) in the shared lock table.

In the situation where the shared record table is consulted, this may be considered as a variation of a shared database or data structure, where each machine has a local copy of a shared table (that is a replica of a shared table) with is updated to maintain coherency across the plurality of machines M1, . . . , Mn.

In one embodiment, the shared record table refers to a shared table accessible by all machines M1, . . . , Mn, that may for example be defined or stored in a commonly accessibly database such that any machine M1, . . . , Mn can consult or read this shared database table for the locked or unlocked status of an object. A further alternative arrangement is to implement a shared record table as a table in the memory of an additional machine (which we call "machine X") which stores each object identification name and its lock status, and serves as the central repository which all other machines M1, . . . , Mn consult to determine locked status of similar equivalent objects.

In any of these different alternative implementations, the manner in which a one of, or a plurality of, similar equivalent objects is marked or identified as being synchronized (or locked) or unsynchronized (or unlocked) is relatively unimportant, and various stored memory bits or bytes or flags may be utilized as are known in the art to identify either one of the two possible logic states. It will also be appreciated that in the present embodiment, that synchronized is largely synonymous with locked and unsynchronized is largely synonymous with unlocked. These same considerations apply for classes as well as for other assets or resources.

Recall that the DRT 71 is responsible for determining the locked status for an object (or class, or other asset, corresponding to a plurality of similar equivalent objects or classes or assets) seeking to be locked before allowing the synchronization routine corresponding to the acquisition of that lock to proceed. In the exemplary embodiment described here, the DRT consults the shared synchronization record table which in one embodiment resides on an special "machine X", and therefore the DRT needs to communicate via the network or other communications link or path with this machine X to enquire as to and determine the locked (or unlocked) status of the object (or class or other asset corresponding to a plurality of similar equivalent objects or classes or assets).

If the DRT on the local machine that is trying to execute a synchronization routine or other mutual exclusion operation determines that no other machine currently has a lock for this object (i.e., no other machine has synchronized this object) or any other one of a plurality of similar equivalent objects, then to acquire the lock for this object corresponding to the plurality of similar equivalent objects on all other machines, for example by means of modifying the corresponding entry in a shared table of locked states for the object sought to be locked or alternatively, sequentially acquiring the lock on all other similar equivalent objects on all other machines in addition to the current machine. Note that the intent of this procedure is to lock the plurality of similar equivalent objects (or classes or assets) on all the other machines M1, . . . , Mn so that simultaneous or concurrent use of any similar equivalent objects by two or more machines is prevented, and any available approach may be utilized to accomplish this coordinated locking. For example, it does not matter if machine M1 instructs M2 to lock its similar equivalent local object, then instructs M3 to lock its similar equivalent local object, and then instructs M4 and so on; or if M1 instructs M2 to lock its similar equivalent local object, and then M2 instructs M3 to lock its similar equivalent local object, and then M3 instructs M4 to lock its similar equivalent local object, and so forth, what is being sought is the locking of the similar equivalent objects on all other machines so that simultaneous or concurrent use any similar equivalent objects by two or more machines is prevented. Only once this machine has successfully confirmed that no other machine has currently locked a similar equivalent object, and this machine has correspondingly locked its locally similar equivalent object, can the execution of the synchronization routine or code-block begin.

On the other hand, if the DRT 71 within the machine about to execute a synchronization routine (such as machine M1) determines that another machine, such as machine M4 has already synchronized a similar equivalent object, then this machine M1 is to postpone continued execution of the synchronization routine (or code-block) until such a time as the DRT on machine M1 can confirm than no other machine (such as one of machines M2, M3, M4, or M5, . . . , Mn) is presently executing a synchronize routine on a corresponding similar equivalent local object, and that this machine M1 has correspondingly synchronized its similar equivalent object locally. Recall that local synchronization refers to prior art conventional synchronization on a single machine, whereas global or coordinated synchronization refers to coordinated synchronization of, across and/or between similar equivalent local objects each on a one of the plurality of machines M1 . . . Mn. In such a case, the synchronization routine (or code-block) is not to continue execution until this machine M1 can guarantee that no other machine M2, M3, M4, . . . , Mn is executing a synchronization routine corresponding to the local similar equivalent object being sought to be locked, as it will potentially corrupt the object across the participating machines M1, M2, M3, . . . , Mn due to susceptibility to conflicts or other unwanted interactions such as race-conditions, and the like problems resulting from the concurrent execution of synchronization routines. Thus, when the DRT determines that this object, or a similar equivalent object on another machine, is presently "locked", say by machine M4 (relative to all other machines), the DRT on machine M1 pauses execution of the synchronization routine by pausing the execution of the acquire lock (e.g., "acquireLock( )") operation until such a time as a corresponding release lock (e.g., "releaseLock( )") operation is executed by the present owner of the lock (e.g., machine M4).

Thus, on execution of a release lock (e.g. "releaseLock( )") operation, the machine M4 which presently "owns" or holds a lock (i.e., is executing a synchronization routine) indicates the close of its synchronization routine, for example by marking this object as "unlocked" in the shared table of locked states, or alternatively, sequentially releasing locks acquired on all other machines. At this point, a different machine waiting to begin execution of a paused synchronization statement can then claim ownership of this now released lock by resuming execution of its postponed (i.e. delayed) "acquireLock( )" operation, for example, by marking itself as executing a lock for this similar equivalent object in the shared table of synchronization states, or alternatively, sequentially acquiring local locks of similar equivalent objects on each of the other machines. It is to be understood that the resumed execution of the acquire lock (e.g., "acquireLock") operation is to be inclusive of the optional resumption of execution of the acquire lock (e.g., "acquireLock") method at the point that execution was paused, as well as the alternative optional arrangement wherein the execution of the acquire lock (e.g., "acquireLock") operation is repeated so as to re-request the lock. Again, these same considerations also apply for classes and more generally to any asset or resource.

So, according to at least one embodiment and taking advantage of the operation of the DRT 71, the application code 50 is modified as it is loaded into the machine by changing the synchronization routine (consisting of at least a beginning "acquire lock" type instruction (such as a JAVA "monitorenter" instruction) and an ending "release lock" type instruction (such as a JAVA "monitorexit" instruction). "Acquire lock" type instructions commence operation or execution of a mutual exclusion operation, generally corresponding to a particular asset such as a particular memory location or machine resource, and result in the asset corresponding to the mutual exclusion operation being locked with respect to some or all modes of simultaneous or concurrent use, execution or operation. "Release lock" type instructions terminate or otherwise discontinue operation or execution of a mutual exclusion operation, generally corresponding to a particular asset such as a particular memory location or machine resource, and result in the asset corresponding to the mutual exclusion operation being unlocked with respect to some or all modes of simultaneous or concurrent use, execution or operation. The changes made (highlighted in bold) are the modified instructions that the synchronization routine executes. These added instructions for example check if this lock has already been acquired by another machine. If this lock has not been acquired by another machine, then the DRT of this machine notifies all other machines that this machine has acquired the specified lock, and thereby stopping the other machines from executing synchronization routines corresponding to this lock.

The DRT 71 can determine and record the lock status of similar equivalent objects, or other corresponding memory location or machine or software resource on a plurality of machines, in many ways, such as for example, by way of illustration but not limitation:

1. Corresponding to the entry to a synchronization routine by Machine M1, the DRT of machine M1 individually consults or communicates with each machine to ascertain if this global lock is already acquired by any other Machine M2, . . . , Mn different from itself. If this global lock corresponding to this asset or object is or has already been acquired by another one of the machines M2, . . . , Mn then the DRT of Machine M1 pauses execution of the synchronization routine on machine M1 until all other machines no longer own a global lock on this asset or object (that is to say that none of the other machines any longer own a global lock corresponding to this asset or object), at which point machine M1 can successfully acquire the global lock such that all other machines M2, . . . , Mn must now wait for machine M1 to release the global lock before a different machine can in turn acquire it. Otherwise, when it is determined that this global lock corresponding to this asset or object has not already been acquired by another machine M2, . . . , Mn the DRT continues execution of the synchronization routine, and such that all other machines M2, . . . , Mn must now wait for machine M1 to release the global lock before a different machine can in turn acquire it.

Alternatively, 2. Corresponding to the entry to a synchronization routine, the DRT consults a shared table of records (for example a shared database, or a copy of a shared table on each of the participating machines) which indicate if any machine currently "owns" this global lock. If so, the DRT then pauses execution of the synchronization routine on this machine until no machine owns a global lock on a similar equivalent object. Otherwise the DRT records this machine in the shared table (or tables, if there are multiple tables of records, e.g., on multiple machines) as the owner of this global lock, and then continues executing the synchronization routine.

Similarly, when a global lock is released, that is to say, when the execution of a synchronization routine is to end, the DRT can "un-record", alter the status indicator, and/or reset the global lock status of machines in many alternative ways, for example by way of illustration but not limitation:

1. Corresponding to the exit to a synchronization routine, the DRT individually notifies each other machine that it no longer owns the global lock.

Alternatively,

2. Corresponding to the exit to a synchronization routine, the DRT updates the record for this globally locked asset or object (such as for example a plurality of similar equivalent objects or assets) in the shared table(s) of records such that this machine is no longer recorded as owning this global lock.

Still further, the DRT can provide an acquire global lock queue to queue machines needing to acquire a global lock in multiple alternative ways, for example by way of illustration but not limitation:

1. Corresponding to the entry to a synchronization routine by Machine M1 say, the DRT of machine M1 notifies the present owning machine (say Machine M4) of the global lock that machine M1 would like to or needs to acquire the corresponding global lock upon release by the current owning machine in order to perform an operation. The specified machine M4, if there are no other waiting machines, then stores a record of the requesting machine's (i.e., machine M1) interest or request in a table or list, such that machine M4 may know subsequent to releasing the corresponding global lock that the machine M1 recorded in the table or list is waiting to acquire the same global lock, which, following the exit of the synchronization routine corresponding to the global lock held by machine M4, then notifies the waiting machine (i.e. machine M1) specified in the record of waiting machines, that the global lock can be acquired, and thus machine M1 can proceed to acquire the global lock and continue executing its own synchronization routine.

2. Corresponding to the entry to a synchronization routine by machine M1 say, the DRT notifies the present owner of the global lock, say machine M4, that a specific machine (say machine M1) would like to acquire the lock upon release by that machine (i.e., machine M4). That machine M4, if it finds after consulting its records of waiting machines for this locked object, finds that there are already one or more other machines (say machines M2 and M7) waiting, then either appends machine M1 to the end of the list of machines M2 and M7 wanting to acquire this locked object, or alternatively, forwards the request from M1 to the first waiting machine (i.e., machine M2), or any other machine waiting (i.e., machine M7), which then, in turn, records machine M1 in their table or records of waiting machines.

In the example above, for example, the records may be kept on Machine M4 and store a queue or other ordered or indexed list of machines waiting to acquire the lock after Machine M4 releases the lock it holds. This list or queue may then be used or referenced by M4 so that M4 can pass the lock on to other machines in accordance with the order of request or any other prioritization scheme. Alternatively, the list may be unordered, and machine M4 may pass the global lock on to any machine in the list or record.

3. Corresponding to the entry to a synchronization routine, the DRT records itself in a shared table(s) of records (for example, a table stored in a shared database accessible by all machines, or multiple separate tables which are substantially similar).

Still further or in the alternative, the DRT 71 can notify other machines queued to acquire this global lock corresponding to the exit of a synchronization routine by this machine in the following alternative ways, for example:

1. Corresponding to the exit of a synchronization routine, the DRT notifies one of the awaiting machines (for example, this first machine in the queue of waiting machines) that the global lock is released, 2. Corresponding to the exit of a synchronization routine, the DRT notifies one of the awaiting machines (for example, the first machine in the queue of waiting machines) that the global lock is released, and additionally, provides a copy of the entire queue of machines (for example, the second machine and subsequent machines awaiting for this global lock). This way, the second machine inherits the list of waiting machines from the first machine, and thereby ensures the continuity of the queue of waiting machines as each machine in turn down the list acquires and subsequently releases the same global lock.

During the abovementioned scrutiny, "monitorenter" and "monitorexit" instructions (or methods) are initially looked for and, when found, a modifying code is inserted so as to give rise to a modified synchronization routine. This modified routine additionally acquires and releases the global lock. There are several different modes whereby this modification and loading can be carried out.

As seen in FIG. 15 a modification to the general arrangement of FIG. 8 is provided in that machines M1, M2 . . . Mn are as before and run the same application code 50 (or codes) on all machines M1 . . . Mn simultaneously or concurrently. However, the previous arrangement is modified by the provision of a server machine X which is conveniently able to supply housekeeping functions, for example, and especially the synchronization of structures, assets, and resources. Such a server machine X can be a low value commodity computer such as a PC since its computational load is low. As indicated by broken lines in FIG. 15, two server machines X and X+1 can be provided for redundancy purposes to increase the overall reliability of the system. Where two such server machines X and X+1 are provided, they are preferably but optionally operated as redundant machines in a failover arrangement.

It is not necessary to provide a server machine X as its computational load can be distributed over machines M1, M2 . . . Mn. Alternatively, a database operated by one machine (in a master/slave type operation) can be used for the housekeeping function(s).

Figure 16:
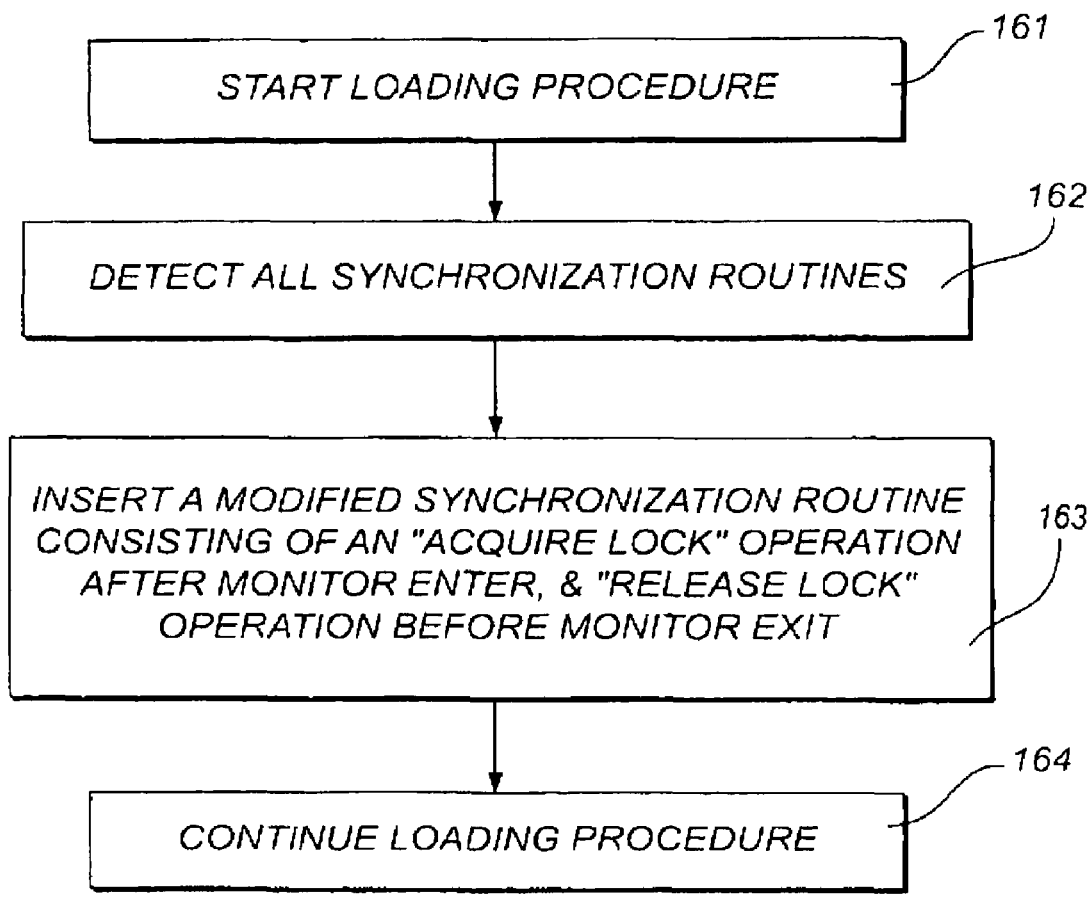
FIG. 16 is a flow chart of illustrating the modification of the monitor enter and exit routines.

FIG. 16 shows a preferred general procedure to be followed. After loading 161 has been commenced, the instructions to be executed are considered in sequence and all synchronization routines are detected as indicated in step 162. In the JAVA language these are the "monitorenter" and "monitorexit" instructions, and methods marked as synchronized in the method descriptor. Other languages use different terms.

Where a synchronization routine is detected 162, it is modified in step 163 in order to perform consistent, coordinated, and coherent synchronization operation (or other mutual exclusion operation) across the plurality of machines M1 . . . Mn, typically by inserting further instructions into the synchronization (or other mutual exclusion) routine to, for example, coordinate the operation of the synchronization routine amongst and between similar equivalent synchronization or other mutual exclusion operations on other one or more of the plurality of machines M1 . . . Mn, so that no two or more machines execute a similar equivalent synchronization or other mutual exclusion operation at once or overlapping. Alternatively, the modifying instructions may be inserted prior to the routine, such as for example prior to the instruction(s) or operation(s) related to a synchronization routine. Once the modification step 163 has been completed the loading procedure continues by loading the modified application code in place of the unmodified application code, as indicated in step 164. The modifications preferably take the form of an "acquire lock on all other machines" operation and a "release lock on all other machines" modification as indicated at step 163.

Figure 17:
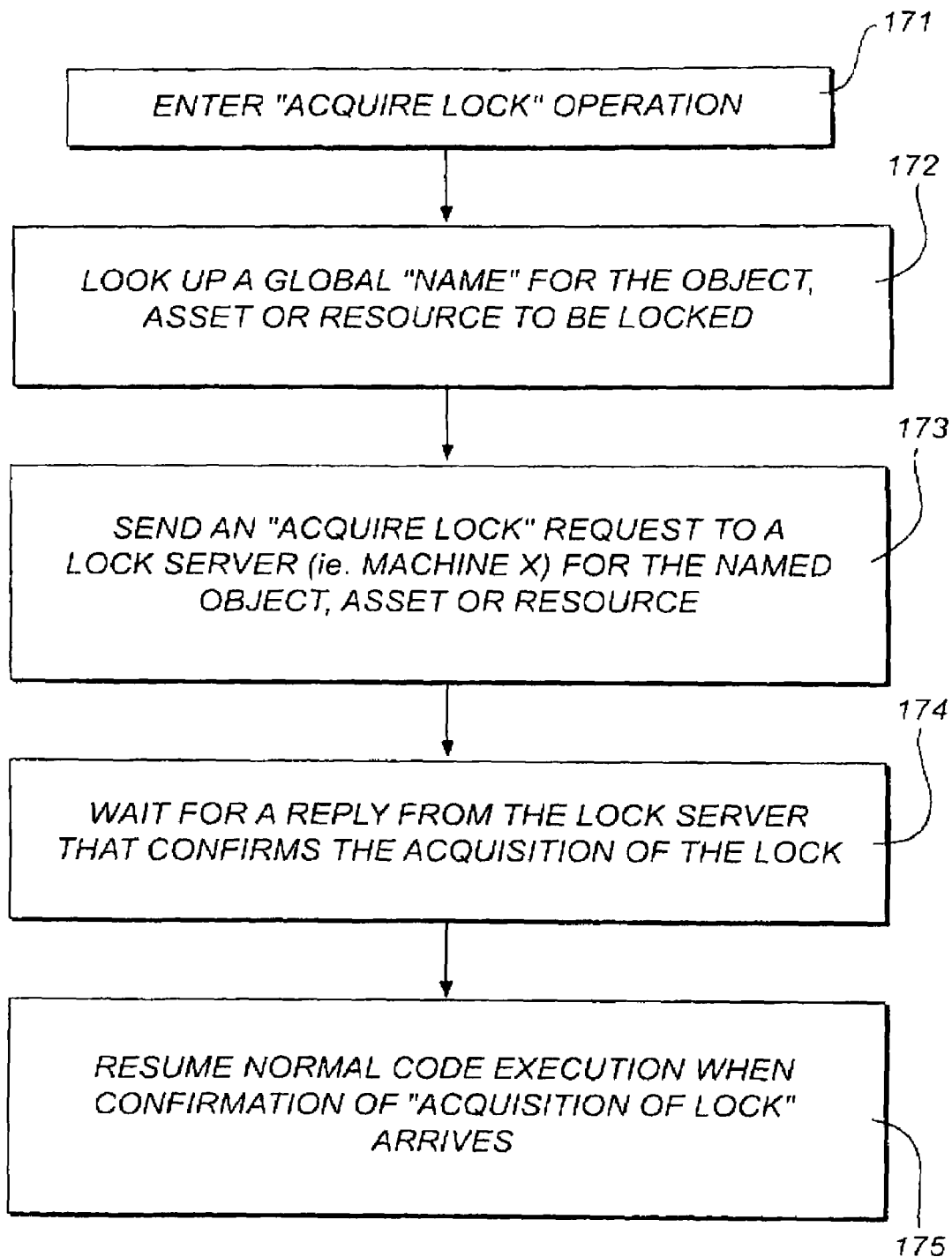
FIG. 17 is a flow chart illustrating the process followed by processing machine in requesting the acquisition of a lock.

FIG. 17 illustrates a particular form of modification. Firstly, the structures, assets or resources (in JAVA termed classes or objects eg 50A, 50X-50Y) or more generally "locks" to be synchronized have already been allocated a name or tag (for example a global name or tag) which can be used to identify corresponding similar equivalent local objects, or assets, or resources, or locks on each of the machines M1 . . . Mn, as indicated by step 172. This preferably happens when the classes or objects are originally initialized. This is most conveniently done via a table maintained by server machine X. This table also includes the synchronization status of the class or object or lock. It will be understood that this table or other data structure may store only the synchronization status, or it may store other status or information as well. In the preferred embodiment, this table also includes a queue arrangement which stores the identities of machines which have requested use of this asset or lock.

As indicated in step 173 of FIG. 17, next an "acquire lock" request is sent to machine X, after which, the sending machine awaits for confirmation of lock acquisition as shown in step 174. Thus, if the global name is already locked (i.e. a corresponding similar local asset is in exclusive use by another machine other than the machine proposing to acquire the lock) then this means that the proposed synchronization routine of the corresponding object or class or asset or lock should be paused until the corresponding object or class or asset or lock is unlocked by the current owner.

Alternatively, if the global name is not locked, this means that no other machine is exclusively using a similar equivalent class, object, asset or lock, and confirmation of lock acquisition is received straight away. After receipt of confirmation of lock acquisition, execution of the synchronization routine is allowed to continue, as shown in step 175.

Figure 18:
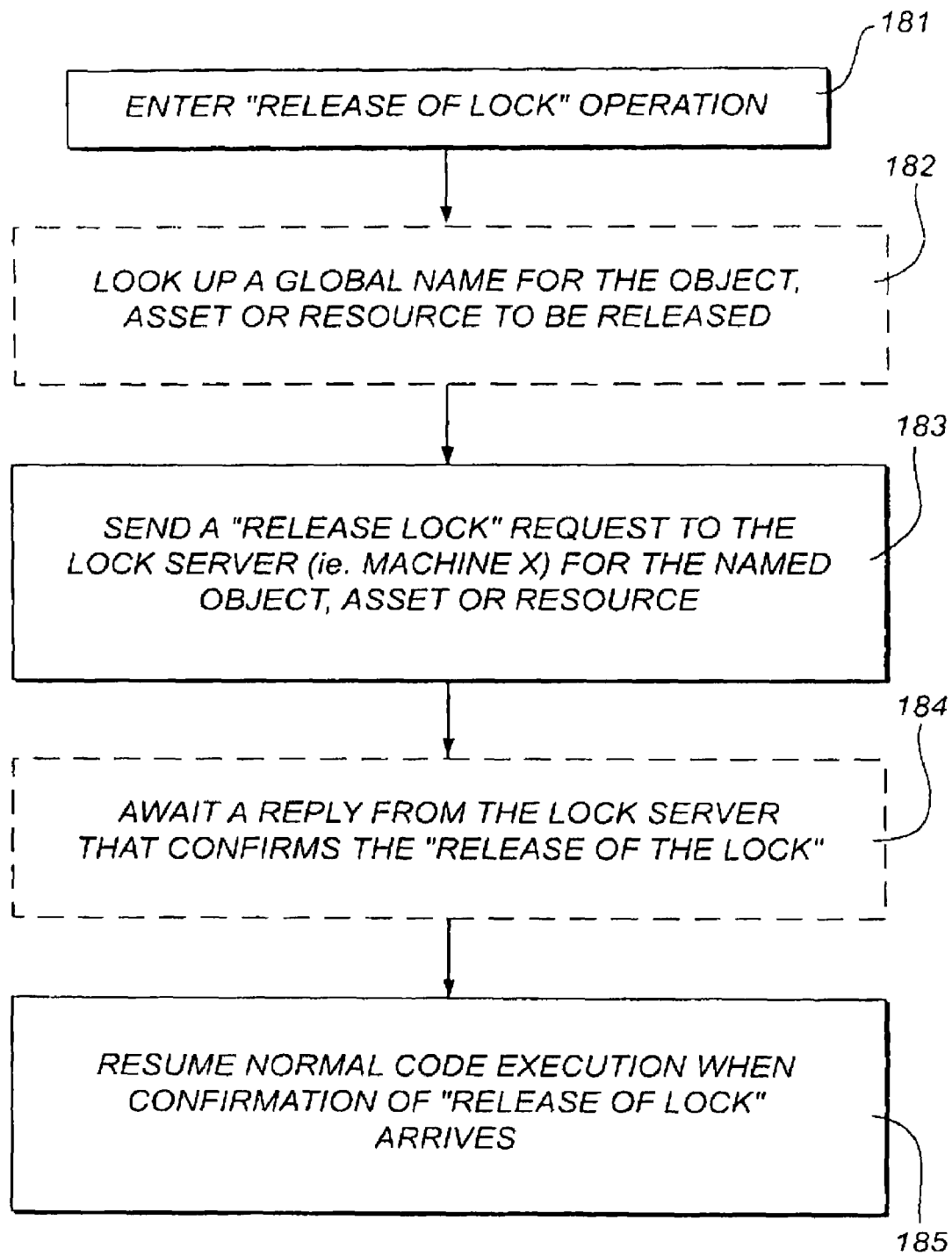
FIG. 18 is a flow chart illustrating the requesting of the release of a lock.

FIG. 18 shows the procedures followed by the application program executing machine which wishes to relinquish a lock. The initial step is indicated at step 181. The operation of this proposing machine is temporarily interrupted by steps 183, 184 until the reply is received from machine X, corresponding to step 184, and execution then resumes as indicated in step 185. Optionally, and as indicated in step 182, the machine requesting release of a lock is made to lookup the "global name" for this lock preceding a request being made to machine X. This way, multiple locks on multiple machines may be acquired and released without interfering with one another.

FIG. 19 shows the activity carried out by machine X in response to an "acquire lock" enquiry (of FIG. 17). After receiving an "acquire lock" request at step 191, the lock status is determined at steps 192 and 193 and, if no—the named resource is not free or otherwise "locked", the identity of the inquiring machine is added at step 194 to (or forms) the queue of awaiting acquisition requests. Alternatively, if the answer is yes—the named resource is free and "unlocked"—the corresponding reply is sent at step 197. The waiting inquiring machine is then able to execute the synchronization routine accordingly by carrying out step 175 of FIG. 17. In addition to the yes response, the shared table is updated at step 196 so that the status of the globally named asset is changed to "locked".

FIG. 10 shows the activity carried out by machine X in response to a "release lock" request of FIG. 18. After receiving a "release lock" request at step 201, machine X optionally, and preferably, confirms that the machine requesting to release the global lock is indeed the current owner of the lock, as indicated in step 202. Next, the queue status is determined at step 203 and, if no-one is waiting to acquire this lock, machine X marks this lock as "unowned" (or "unlocked") in the shared table, as shown in step 207, and optionally sends a confirmation of release back to the requesting machine, as indicated by step 208. This enables the requesting machine to execute step 185 of FIG. 18.

Alternatively, if yes—that is, other machines are waiting to acquire this lock-machine X marks this lock as now acquired by the next machine in the queue, as shown in step 204, and then sends a confirmation of lock acquisition to the queued machine at step 205, and consequently removes the new lock owner from the queue of waiting machines, as indicated in step 206.

Given the fundamental concept of modifying the synchronization routines (or other mutual exclusion operations or operators) to coordinate operation between and amongst a plurality of machines M1 . . . Mn, there are several different ways or embodiments in which this coordinated, coherent and consistent synchronization (or other mutual exclusion) operation concept, method, and procedure may be carried out or implemented.

In the first embodiment, a particular machine, say machine M2, loads the asset (for example a class or object) inclusive of a synchronization routine(s), modifies it, and then loads each of the other machines M1, M3 . . . Mn (either sequentially, or simultaneously or according to any other order, routine, or procedure) with the modified asset (or class or object) inclusive of the new modified synchronization routine(s). Note that there may be one or a plurality of routine(s) corresponding to only one object in the application code, or there may be a plurality of routines corresponding to a plurality of objects in the application code. Note that in one embodiment, the synchronization routine(s) that is (are) loaded is binary executable object code. Alternatively, the synchronization routine(s) that is (are) loaded is executable intermediate code.

In this arrangement, which may be termed "master/slave" each of the slave (or secondary) machines M1, M3, . . . , Mn loads the modified object (or class), and inclusive of the new modified synchronization routine(s), that was sent to it over the computer communications network or other communications link or path by the master (or primary) machine, such as machine M2, or some other machine such as a machine X of FIG. 15. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a further variation of this "master/slave" or "primary/secondary" arrangement, machine M2 loads asset (such as class or object) inclusive of an (or even one or more) synchronization routine in unmodified form on machine M2, and then (for example, machine M2 or each local machine) modifies the class (or object or asset) by deleting the synchronization routine in whole or part from the asset (or class or object) and loads by means of a computer communications network or other communications link or path the modified code for the asset with the now modified or deleted synchronization routine on the other machines. Thus in this instance the modification is not a transformation, instrumentation, translation or compilation of the asset synchronization routine but a deletion of the synchronization routine on all machines except one.

The process of deleting the synchronization routine in its entirety can either be performed by the "master" machine (such as machine M2 or some other machine such as machine X of FIG. 15) or alternatively by each other machine M1, M3, . . . , Mn upon receipt of the unmodified asset. An additional variation of this "master/slave" or "primary/secondary" arrangement is to use a shared storage device such as a shared file system, or a shared document/file repository such as a shared database as means of exchanging the code (including for example, the modified code) for the asset, class or object between machines M1, M2, . . . , Mn and optionally a machine X of FIG. 15.

In a still further embodiment, each machine M1, . . . , Mn receives the unmodified asset (such as class or object) inclusive of one or more synchronization routines, but modifies the routines and then loads the asset (such as class or object) consisting of the now modified routines. Although one machine, such as the master or primary machine may customize or perform a different modification to the synchronization routine sent to each machine, this embodiment more readily enables the modification carried out by each machine to be slightly different and to be enhanced, customized, and/or optimized based upon its particular machine architecture, hardware, processor, memory, configuration, operating system, or other factors, yet still similar, coherent and consistent with other machines with all other similar modifications and characteristics that may not need to be similar or identical.

In a further arrangement, a particular machine, say M1, loads the unmodified asset (such as class or object) inclusive of one or more synchronization routines and all other machines M2, M3, . . . , Mn perform a modification to delete the synchronization routine(s) of the asset (such as class or object) and load the modified version.

In all of the described instances or embodiments, the supply or the communication of the asset code (such as class code or object code) to the machines M1, . . . , Mn, and optionally inclusive of a machine X of FIG. 15, can be branched, distributed or communicated among and between the different machines in any combination or permutation; such as by providing direct machine to machine communication (for example, M2 supplies each of M1, M3, M4, etc. directly), or by providing or using cascaded or sequential communication (for example, M2 supplies M1 which then supplies M3 which then supplies M4, and so on), or a combination of the direct and cascaded and/or sequential.

In a still further arrangement, the machines M1 to Mn, may send some or all load requests to an additional machine X (see for example the embodiment of FIG. 15), which performs the modification to the application code 50 inclusive of an (and possibly a plurality of) synchronization routine(s) via any of the afore mentioned methods, and returns the modified application code inclusive of the now modified synchronization routine(s) to each of the machines M1 to Mn, and these machines in turn load the modified application code inclusive of the modified routines locally. In this arrangement, machines M1 to Mn forward all load requests to machine X, which returns a modified application program code 50 inclusive of modified synchronization routine(s) to each machine. The modifications performed by machine X can include any of the modifications covered under the scope of the present invention. This arrangement may of course be applied to some of the machines and other arrangements described herein before applied to other of the machines.

Persons skilled in the computing arts will be aware of various possible techniques that may be used in the modification of computer code, including but not limited to instrumentation, program transformation, translation, or compilation means.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

Having now described aspects of the memory management and replication and synchronization, attention is now directed to an exemplary operational scenario illustrating the manner in which application programs on two computers may simultaneously execute the same application program in a consistent, coherent manner.

In this regard, attention is directed to FIGS. 31-33, two laptop computers 101 and 102 are illustrated. The computers 101 and 102 are not necessarily identical and indeed, one can be an IBM or IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 314.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 310. Again, after loading, the box 310 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

Figure 23:
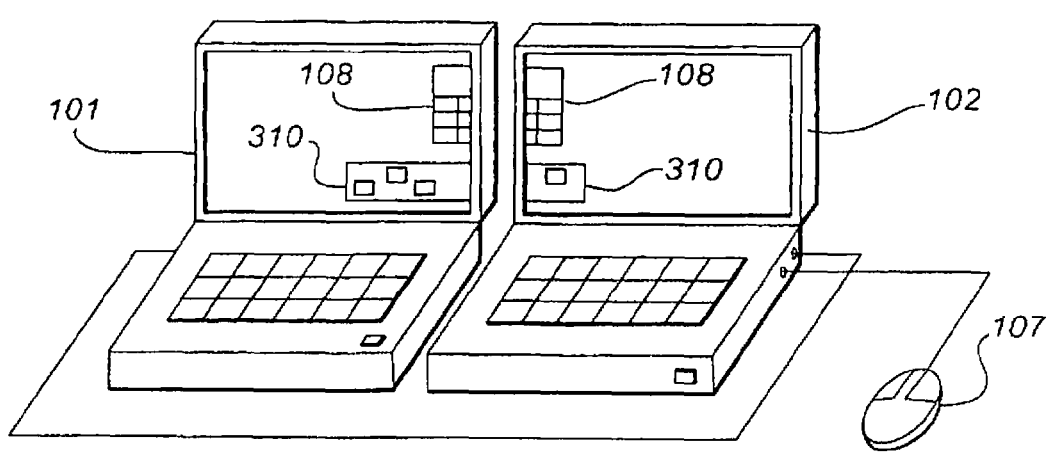
FIG. 23 is a view similar to FIGS. 21 and 22 but showing the FIG. 21 apparatus with both applications operating simultaneously on both computers.

The mouse 107 can be used to "grab" the box 310 and move same to the right across the screen 105 and onto the screen 115 so as to arrive at the situation illustrated in FIG. 23. In this arrangement, the calculator application is being conducted on machine 101 whilst the graphics application resulting in display of box 310 is being conducted on machine 102.

Figure 22:
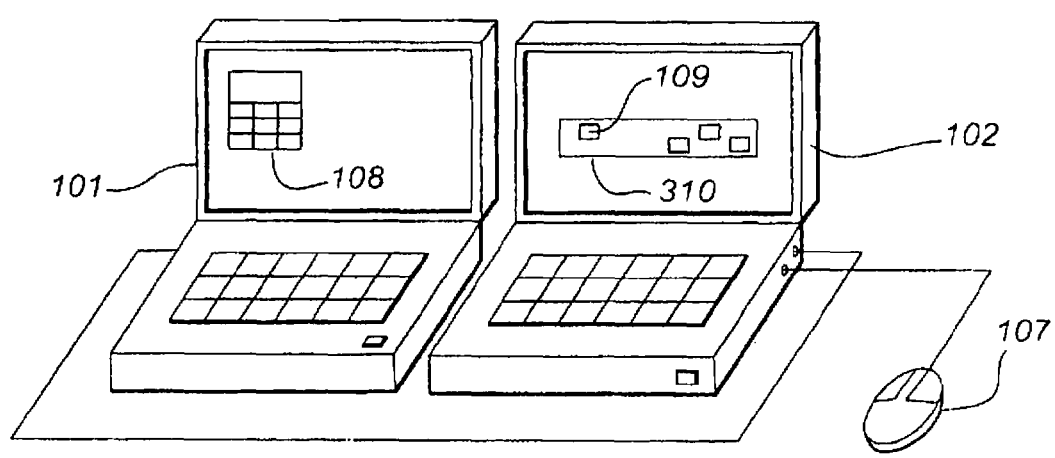
FIG. 22 is a view similar to FIG. 21 but showing the FIG. 21 apparatus with one application operating on each computer.

However, as illustrated in FIG. 23, it is possible by means of the mouse 107 to drag the calculator 108 to the right as seen in FIG. 22 so as to have a part of the calculator 108 displayed by each of the screens 105, 115. Similarly, the box 310 can be dragged by means of the mouse 107 to the left as seen in FIG. 22 so that the box 310 is partially displayed by each of the screens 105, 115 as indicated FIG. 23. In this configuration, part of the calculator operation is being performed on machine 101 and part on machine 102 whilst part of the graphics application is being carried out the machine 101 and the remainder is carried out on machine 102.

FURTHER DESCRIPTION

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

An advantage of using a global identifier in the invention described is as a form of 'meta-name' or 'meta-identity' for all the similar equivalent local objects (or classes, or assets or resources or the like) on each one of the plurality of machines M1, . . . , Mn. For example, rather than having to keep track of each unique local name or identity of each similar equivalent local object on each machine of the plurality of similar equivalent objects, one may instead define or use a global name corresponding to the plurality of similar equivalent objects on each machine (e.g., "globalname7787"), and with the understanding that each machine relates the global name to a specific local name or object (e.g., "globalname7787" corresponds to object "localobject456" on machine M1, and "globalname7787" corresponds to object "localobject885" on machine M2, and "globalname7787" corresponds to object "localobject111" on machine M3, and so forth).

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned arrangement, in which the JAVA code which updates memory locations or field values is modified, is based on the assumption that either the runtime system (say, JAVA HOTSPOT VIRTUAL MACHINE written in C and Java) or the operating system (LINUX written in C and Assembler, for example) of each machine M1 . . . Mn will ordinarily update memory on the local machine (say M2) but not on any corresponding other machines (M1, M3 . . . Mn). It is possible to leave the JAVA code which updates memory locations or field values unamended and instead amend the LINUX or HOTSPOT routine which updates memory locally, so that it correspondingly updates memory on all other machines as well. In order to embrace such an arrangement the term "updating propagation routine" used herein in conjunction with maintaining the memory of all machines M1 . . . Mn essentially the same, is to be understood to include within its scope both the JAVA putfield and putstatic instructions and related operations and the "combination" of the JAVA putfield and putstatic operations and the LINUX or HOTSPOT code fragments which perform memory updating.

The abovementioned embodiment in which the code of the JAVA synchronization routine is modified, is based upon the assumption that either the run time system (say, JAVA HOTSPOT VIRTUAL MACHINE written in C and JAVA) or the operating system (LINUX written in C and Assembler, for example) of each machine M1 . . . Mn will normally acquire the lock on the local machine (say M2) but not on any other machines (M1, M3 . . . Mn). It is possible to leave the JAVA synchronization routine unamended and instead amend the LINUX or HOTSPOT routine which acquires the lock locally, so that it correspondingly acquires the lock on all other machines as well. In order to embrace such an arrangement the term "synchronization routine" is to be understood to include within its scope both the JAVA synchronization routine and the "combination" of the JAVA synchronization routine and the LINUX or HOTSPOT code fragments which perform lock acquisition and release.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, propagation means, distribution update means, counter means, synchronization means, and the like. In at least one embodiment of the invention, any one or each of these various means may be implemented by computer program code statements or instructions (possibly including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by an combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

The invention may therefore includes a computer program product comprising a set of program instructions stored in a storage medium or exiting electronically in any form and operable to permit a plurality of computers to carry out any of the methods, procedures, routines, or the like as described herein including in any of the claims.

Furthermore, the invention may include a plurality of computers interconnected via a communication network or other communications ink or path and each operable to substantially simultaneously or concurrently execute the same or a different portion of an application program code written to operate on only a single computer on a corresponding different one of computers, wherein the computers being programmed to carry out any of the methods, procedures, or routines described in the specification or set forth in any of the claims, or being loaded with a computer program product.

The term "comprising" (and its grammatical variations) as used herein is used in the inclusive sense of "having" or "including" and not in the exclusive sense of "consisting only of".

Copyright Notice

This patent specification and the Annexures which form a part thereof contains material which is subject to copyright protection. The copyright owner (which is the applicant) has no objection to the reproduction of this patent specification or related materials from publicly available associated Patent Office files for the purposes of review, but otherwise reserves all copyright whatsoever. In particular, the various instructions are not to be entered into a computer without the specific written approval of the copyright owner.

I claim:

1. In a multiple computer system including a plurality of single computers interconnected via a communications link, a method of operating an application program having code written to include a plurality of threads all intended to execute on and reference a single independent computer having a single central processing unit (CPU) or symmetric multiple processing units and a single independent local memory that is not shared with any other computer of said plurality of single computers, said method comprising:(a) allocating said plurality of application program code threads amongst said plurality of interconnected single computers so that at least a portion of the application program including at least one first thread of said application program code is allocated a first particular one of said plurality of single computers for execution thereon and at least one second thread of said application program code is allocated a second particular one of said plurality of single computers for execution thereon;(b) operating each single computer so that the memory locations of its single independent local memory are only addressable by the thread or threads allocated for execution thereon;(c) substantially simultaneously executing said allocated application program code thread or threads by those single computers having an application program code thread or threads allocated thereto for execution;(d) storing, during or after execution, by said single computer in its single independent local memory, an original version of each application memory value addressable by execution of said thread or threads allocated thereto;(e) communicating an update via said communications link, a replica version of each new original version of each application memory value which has overwritten a previous corresponding application memory value as a consequence of execution of said thread or threads on any said single computer, to the single independent local memory of all other ones of said plurality of single computers; and(f) storing in said single independent local memory of all of said plurality of single computers said communicated updated replica version of each and every application memory value; (g) locking memory locations in each said single computer wherein any single computer wishing to utilize a memory location therein acquires an authorizing lock within the multiple computer system which permits said utilization of said memory location and which prevents all the other of the single computers from utilizing their corresponding memory location until said authorizing lock is relinquished; and(h) the stored application memory values, including said original versions and said replica versions, of all said single computers thereby remaining, subject to a communications link updating transmission delay, substantially identical without any of said single computers addressing the independent local memory of any other one of said plurality of single computers during execution of their allocated thread or threads.

2. A computer program product stored on a tangible machine-readable medium and including executable instructions for, in a multiple computer system including a plurality of single computers interconnected via a communications link, implementing a method of operating an application program having code written to include a plurality of threads all intended to execute on and reference a single independent computer having a single central processing unit (CPU) or symmetric multiple processing units and a single independent local memory that is not shared with any other computer of said plurality of single computers, said executable instruction performing a method comprising:(a) allocating said plurality of application program code threads amongst said plurality of interconnected single computers so that at least a portion of the application program including at least one first thread of said application program code is allocated a first particular one of said plurality of single computers for execution thereon and at least one second thread of said application program code is allocated a second particular one of said plurality of single computers for execution thereon;(b) operating each single computer so that the memory locations of its single independent local memory are only addressable by the thread or threads allocated for execution thereon;(c) substantially simultaneously executing said allocated application program code thread or threads by those single computers having an application program code thread or threads allocated thereto for execution;(d) storing, during or after execution, by said single computer in its single independent local memory, an original version of each application memory value addressable by execution of said thread or threads allocated thereto;(e) communicating an update via said communications link, a replica version of each new original version of each application memory value which has overwritten a previous corresponding application memory value as a consequence of execution of said thread or threads on any said single computer, to the single independent local memory of all other ones of said plurality of single computers; and(f) storing in said single independent local memory of all of said plurality of single computers said communicated updated replica version of each and every application memory value; and(g) locking memory locations in each said single computer wherein any single computer wishing to utilize a memory location therein acquires an authorizing lock within the multiple computer system which permits said utilization of said memory location and which prevents all the other of the single computers from utilizing their corresponding memory location until said authorizing lock is relinquished; and(h) the stored application memory values, including said original versions and said replica versions, of all said single computers thereby remaining, subject to a communications link updating transmission delay, substantially identical without any of said single computers addressing the independent local memory of any other one of said plurality of single computers during execution of their allocated thread or threads.

3. The method as claimed in claim 1, wherein the communicating includes executing an updating propagation routine.

4. The method as claimed in claim 3, wherein executing the updating propagation routine includes communicating the identity of updated, changed, or manipulated memory location, and the updated, manipulated or changed value(s) or content(s) of the manipulated memory location.

5. The method as claimed in claim 4, wherein the updating communication is performed via a slow network communications link or path.

6. The method as claimed in claim 3, wherein each of said plurality of single computers receiving an update communication from the network, writes the memory location value(s) received to the local independent memory location corresponding to the identified memory location received.

7. The method as claimed in claim 5, wherein the communications link includes a communications link over the Internet.

8. The method as claimed in claim 5, wherein the slow network is a network having a communications speed of operation that is an order of magnitude slower than the speed of operation of the bus on the single computers.

9. The method as claimed in claim 3, wherein the communications between the single computers although routed through the single computer machine hardware are controlled by an individual distributed runtime (DRT) within each single computer, the distributed runtime coordinating particular communications between the plurality of single computers.

10. The method as claimed in claim 9, wherein the DRT coordinates communications between the single computers that is transport, protocol, and communications link independent.

11. The method as claimed in claim 3, wherein: all reading of memory locations or data is satisfied locally from the single computer local independent memory because a current value of all (or some subset of all) memory locations is stored on the single computer carrying out the processing of the code threads which generates the demand to read from memory; and all writing of memory locations or data is satisfied locally from the single computer local independent memory because a current value of all (or some subset of all) memory locations is stored on the single computer carrying out the processing of the code threads which generates the demand to write to memory; wherein the demand to write or rewrite memory being relatively lower than the demand to read from memory, so that memory locations can be continually updated at a relatively low speed via a slow and inexpensive commodity network, yet this sufficient to meet the application program demand for writing to memory.

12. A multiple computer system comprising: a plurality of single computers interconnected via a communications link; each of said plurality of single computers: (a) has a single central processing unit (CPU) or symmetric multiple processing units, (b) a single independent local memory which is not shared with any other computer of said plurality of single computers, and (c) that is independent of the other ones of said plurality of single computers; each one of said plurality of single computers is adapted to store and execute at least one thread of a substantially similar copy of an application program having code written to operate only on a single computer system, the code including a plurality of threads all intended to execute in cooperation with a single memory; and each said single independent local memory has memory locations only addressable and accessible by the thread or threads of the corresponding single computer executing the corresponding copy of said application program code, and each said independent local memory has stored therein all application memory values arising from the execution of all said threads of all said plurality of computers;(i) means for allocating or receiving an allocation of said plurality of threads of said stored application program code amongst said plurality of single computers so that at least a portion of the application program including at least one thread of said application program code is allocated to a corresponding one of said plurality of single computers for execution thereon by one or more threads of that one of said plurality of single computers; (ii) means for substantially simultaneously executing said application program code thread or threads by those ones of said plurality of single computers having an application program code thread or threads allocated thereto;(iii) a memory storage for storing in said single independent local memory of each said single computer a replica of each and every application memory value addressable by each and every said thread of each and every one of said plurality of computers; (iv) means for communicating via said communications link each new application memory value which has overwritten a previous corresponding value as a consequence of execution of said application program code on any one of said single computers, to the single independent local memory of all other ones of said plurality of single computers, so that the values of said replica application memory values of all said single computers remain, subject to an updating transmission delay, substantially identical; and(v) lock means applicable to each said single computer wherein any single computer wishing to utilize a memory location therein acquires an authorizing lock from said lock means which permits said utilization of said memory location and which prevents all the other of said single computers from utilizing their corresponding memory location until said authorizing lock is relinquished.

13. The multiple computer system as in claim 12, wherein the communications link comprises an Internet network communications link.

* * * * *